(12) United States Patent
Morris

(10) Patent No.: US 10,772,711 B2
(45) Date of Patent: Sep. 15, 2020

(54) DIRECT DENTAL BRIDGE

(71) Applicant: Christopher Morris, Brampton (CA)

(72) Inventor: Christopher Morris, Brampton (CA)

( * ) Notice: Subject to any disclaimer, the term of this patent is extended or adjusted under 35 U.S.C. 154(b) by 0 days.

(21) Appl. No.: 15/580,660

(22) PCT Filed: Jul. 15, 2016

(86) PCT No.: PCT/CA2016/050840
§ 371 (c)(1),
(2) Date: Dec. 7, 2017

(87) PCT Pub. No.: WO2017/008170
PCT Pub. Date: Jan. 19, 2017

(65) Prior Publication Data
US 2018/0161130 A1 Jun. 14, 2018

Related U.S. Application Data

(60) Provisional application No. 62/231,732, filed on Jul. 15, 2015, provisional application No. 62/285,664, (Continued)

(51) Int. Cl.
*A61C 13/00* (2006.01)
*A61C 13/275* (2006.01)

(52) U.S. Cl.
CPC ........ *A61C 13/0003* (2013.01); *A61C 13/275* (2013.01)

(58) Field of Classification Search
CPC . A61C 5/007; A61C 13/0001; A61C 13/0003; A61C 13/225; A61C 13/2255;
(Continued)

(56) References Cited

U.S. PATENT DOCUMENTS 2,213,963 A  9/1940 Myerson
2,213,964 A  9/1940 Myerson
(Continued)

*Primary Examiner* — Edward Moran
(74) *Attorney, Agent, or Firm* — Elias Borges

(57) ABSTRACT

A reinforcement bar combination for a direct dental bridge, the reinforcement bar combination including: first and second elongate bars, each of the first and second elongate bars contacting a single occlusal preparation formed in a single abutment tooth and each of the first and second elongate bars having an end positioned on a central pad of a third elongate bar to form a reinforcement scaffold. The first elongate bar is a first elongate torque bar that is optionally bent. The second elongate bar is a second elongate torque bar that is optionally bent. The third elongate bar is a proximal bar including a central planar pad bound by a perimeter, a coronal facing surface and an apical facing surface, a first insertion arm extending in a mesial direction from the perimeter of the pad, a second insertion arm extending in a distal direction from the perimeter of the pad; a first vertical sidewall extending in a coronal direction from the coronal oriented surface of the pad; a second vertical sidewall extending in a coronal direction from the coronal oriented surface of the pad. A method of using of the reinforcement bar combination to produce a direct dental bridge is also described.

15 Claims, 16 Drawing Sheets

Related U.S. Application Data filed on Nov. 5, 2015, provisional application No. 62/386,919, filed on Dec. 16, 2015, provisional application No. 62/389,993, filed on Mar. 15, 2016.

(58) Field of Classification Search
CPC ............... A61C 13/275; A61C 13/26; A61C 2013/2753; A61C 2013/2756
See application file for complete search history.

(56) References Cited

U.S. PATENT DOCUMENTS

| | | | |
|---|---|---|---|
| 4,163,318 A * | 8/1979 | Tigani | A61C 13/26 433/172 |
| 4,380,435 A * | 4/1983 | Raeder | A61C 13/26 433/180 |
| 4,431,417 A * | 2/1984 | Weissman | A61C 5/007 433/182 |
| 4,457,714 A * | 7/1984 | Klein | A61C 13/275 433/180 |
| 4,661,067 A | 4/1987 | Harvey, Sr. et al. | |
| 4,764,116 A | 8/1988 | Shoher et al. | |
| 4,820,157 A | 4/1989 | Salvo | |
| 4,877,400 A | 10/1989 | Holsclaw | |
| 4,894,012 A | 1/1990 | Goldberg et al. | |
| 4,950,162 A | 8/1990 | Korber et al. | |
| 4,957,439 A | 9/1990 | Shoher et al. | |
| 5,000,687 A | 3/1991 | Yarovesky et al. | |
| 5,194,001 A | 3/1993 | Salvo | |
| 5,575,651 A | 11/1996 | Weissman | |
| 5,772,438 A * | 6/1998 | Deom | A61C 13/26 433/181 |
| 5,934,907 A * | 8/1999 | Marshall | A61C 13/275 433/180 |
| 5,984,682 A * | 11/1999 | Carlson | A61C 13/26 433/167 |
| 6,039,569 A | 3/2000 | Prasad et al. | |
| 6,050,820 A | 4/2000 | Lans et al. | |
| 6,200,136 B1 * | 3/2001 | Prasad | A61C 5/00 433/180 |
| 6,345,984 B2 | 2/2002 | Karmaker et al. | |
| 2003/0183964 A1 | 10/2003 | Daskalon et al. | |
| 2004/0265782 A1 | 12/2004 | Duray et al. | |
| 2005/0127544 A1 | 6/2005 | Brodkin et al. | |
| 2006/0051723 A1 * | 3/2006 | Morris | A61C 13/275 433/180 |
| 2007/0003904 A1 | 1/2007 | Duray et al. | |
| 2007/0281282 A1 | 12/2007 | Delmonico | |
| 2008/0096166 A1 | 4/2008 | Morris | |
| 2008/0318186 A1 | 12/2008 | Delmonico et al. | |
| 2015/0257984 A1 | 9/2015 | Shchori et al. | |

\* cited by examiner

FIGURE 1
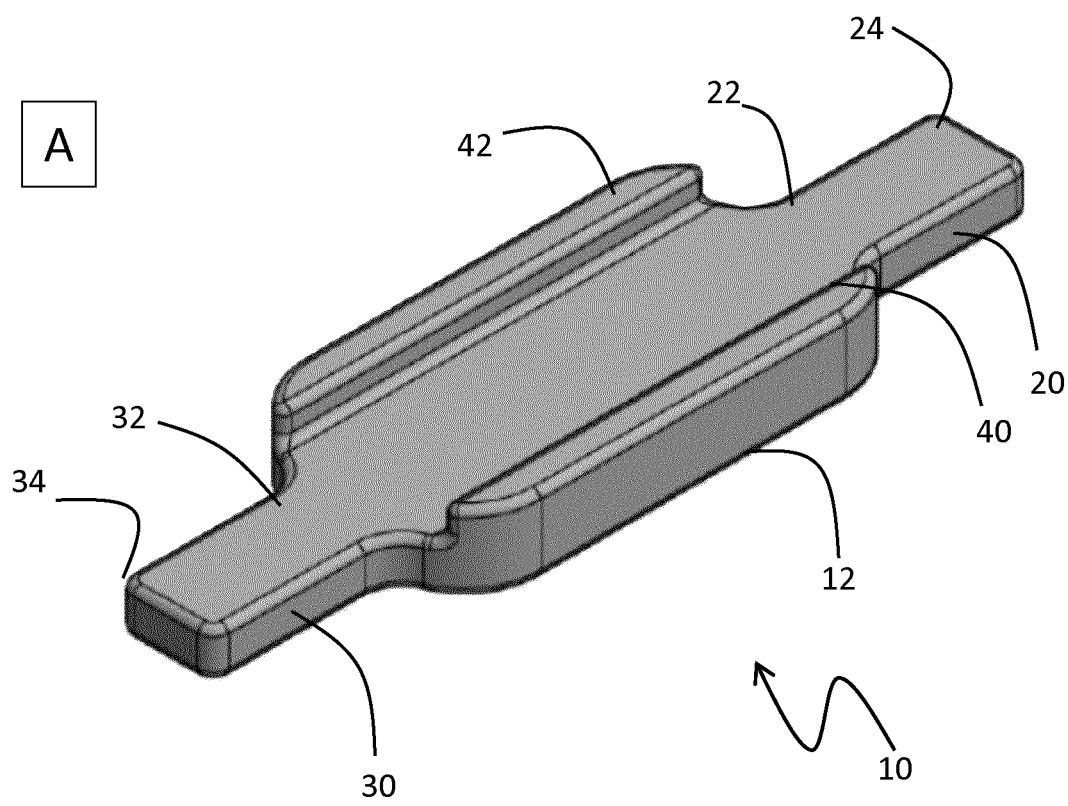
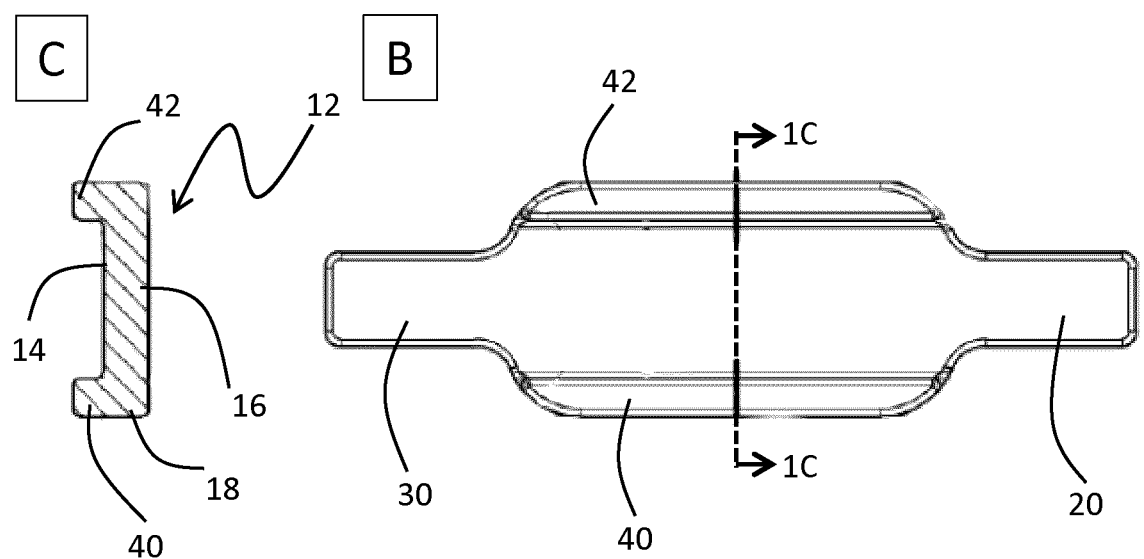

FIGURE 2
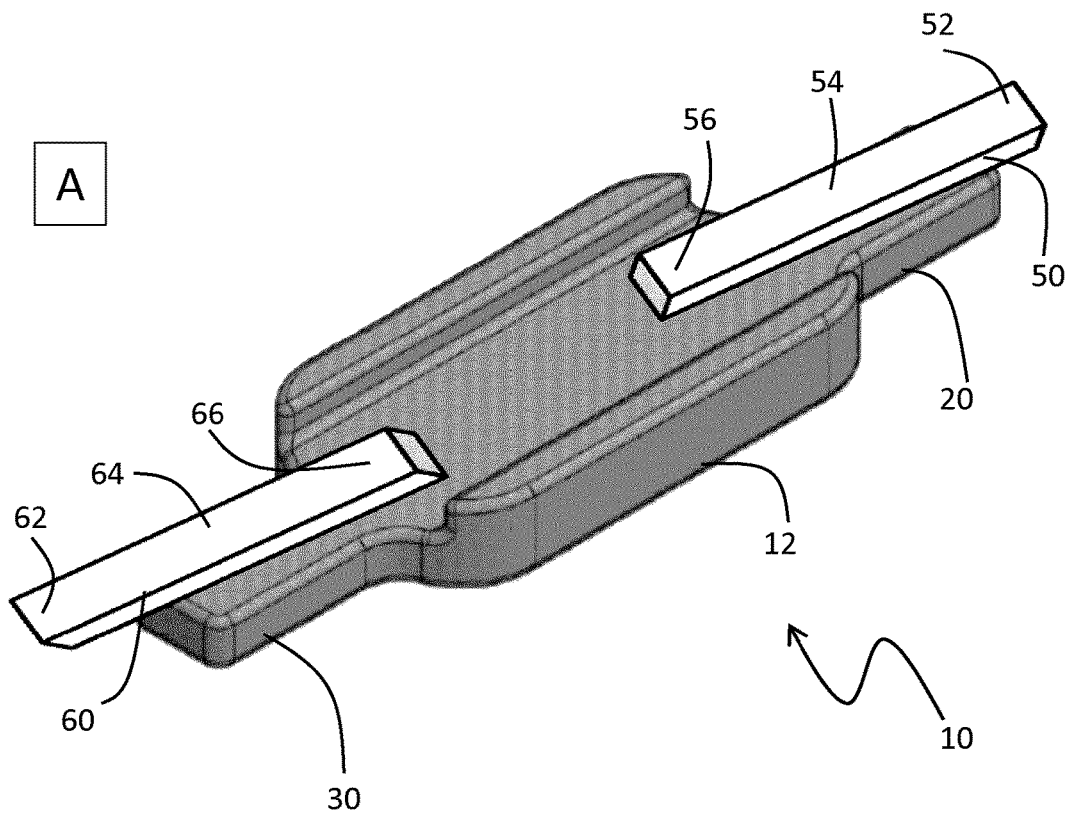
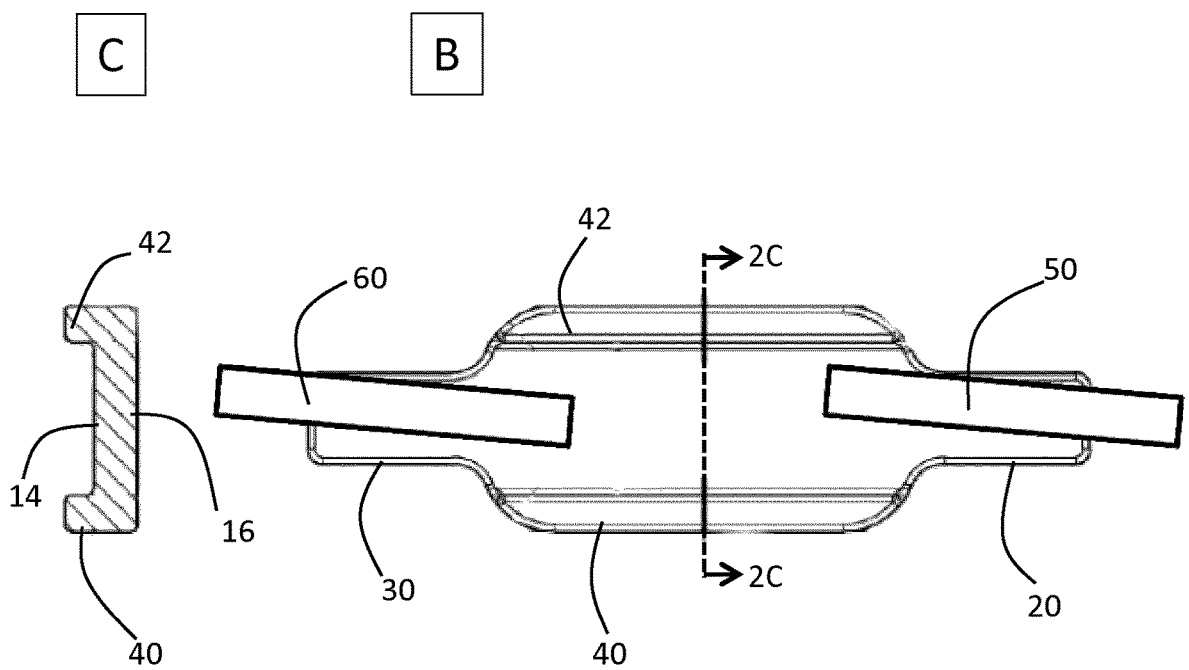

FIGURE 3 (cont'd)
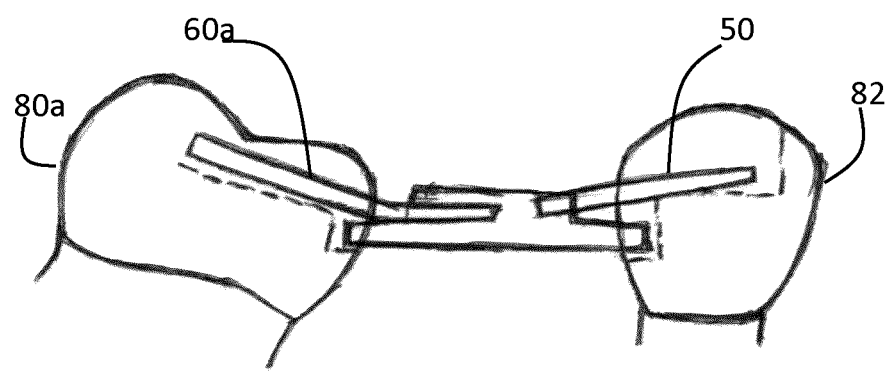
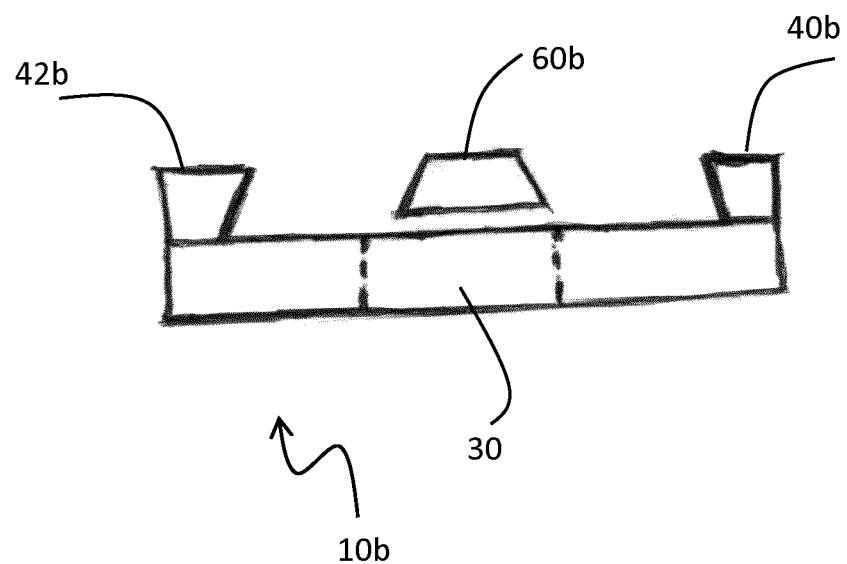

FIGURE 4    Proximal Bar Fracture Test on 13.5mm Span

| Sample Number | Load at Max.Load (kN) | Load at Max.Load (lbf) | Displacement at Max. Load (mm) | Load at Cursor Point 1 (kN) | Load at Cursor Point 1 (lbf) | Displacement at Cursor Point 1 (mm) | Dimension on Left (mm) | Dimension on Middle (mm) | Dimension on Right (mm) |
|---|---|---|---|---|---|---|---|---|---|
| 1 | 0.693 | 156 | 0.370 | 0.693 | 156 | 0.366 | 2.46x1.10 | 1.91x6.13 | 2.45x1.11 |
| 2 | 0.789 | 177 | 0.330 | 0.789 | 177 | 0.331 | 2.46x1.13 | 6.17x1.94 | 2.45x1.12 |
| 3 | 0.801 | 180 | 0.360 | 0.801 | 180 | 0.362 | 2.47x1.11 | 6.16x1.95 | 2.46x1.14 |
| 4 | 0.648 | 146 | 0.320 | 0.648 | 146 | 0.322 | 2.46x1.13 | 6.22x1.95 | 2.40x1.15 |
| Mean | 0.733 | 165 | 0.345 | 0.733 | 179 | 0.346 | NA | NA | NA |
| S.D. | 0.074 | 17 | 0.024 | 0.074 | 17 | 0.022 | NA | NA | NA |

Fig. 5B1
Fig. 5B2
Fig. 5B3
Fig. 5B4

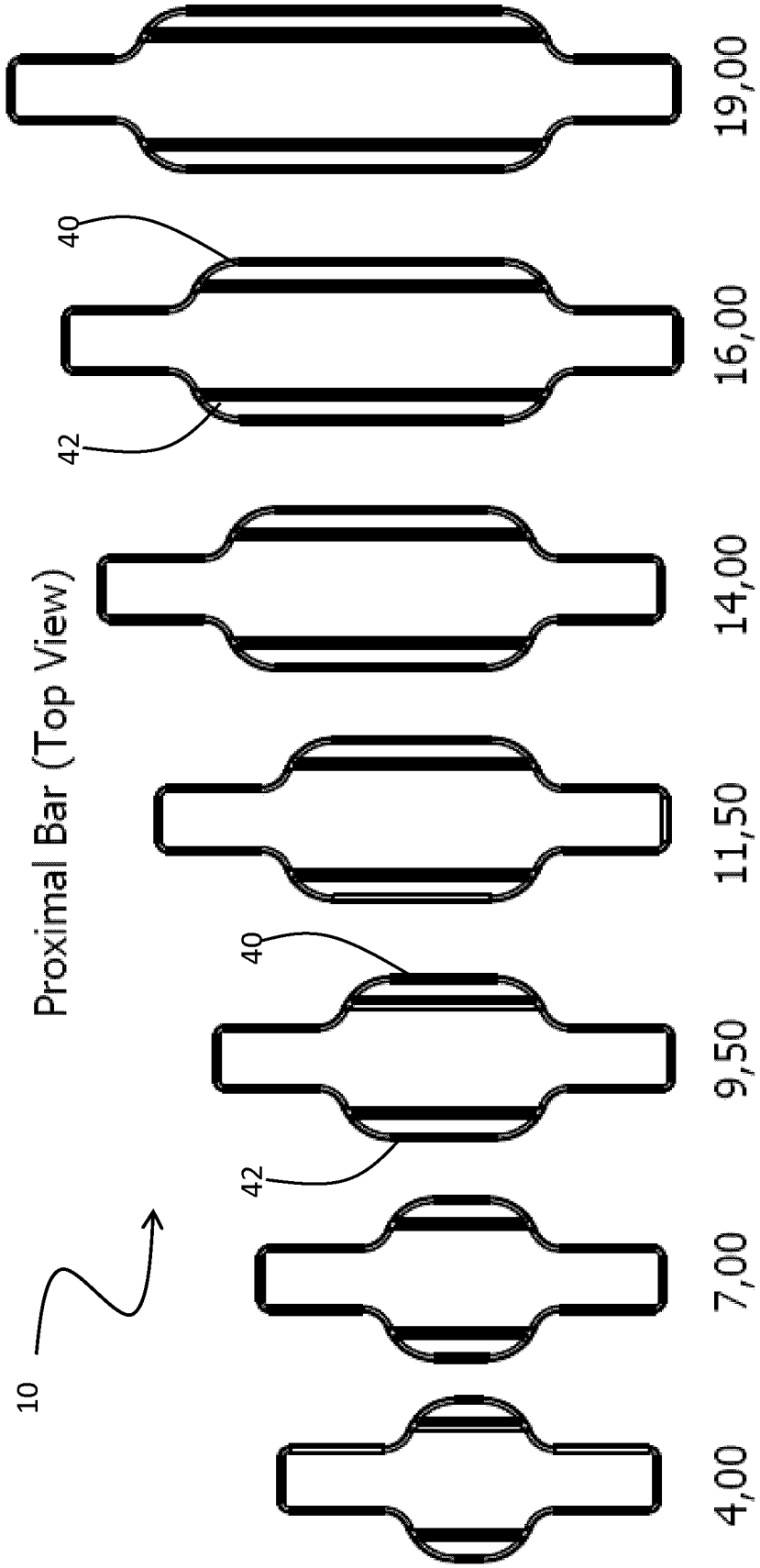

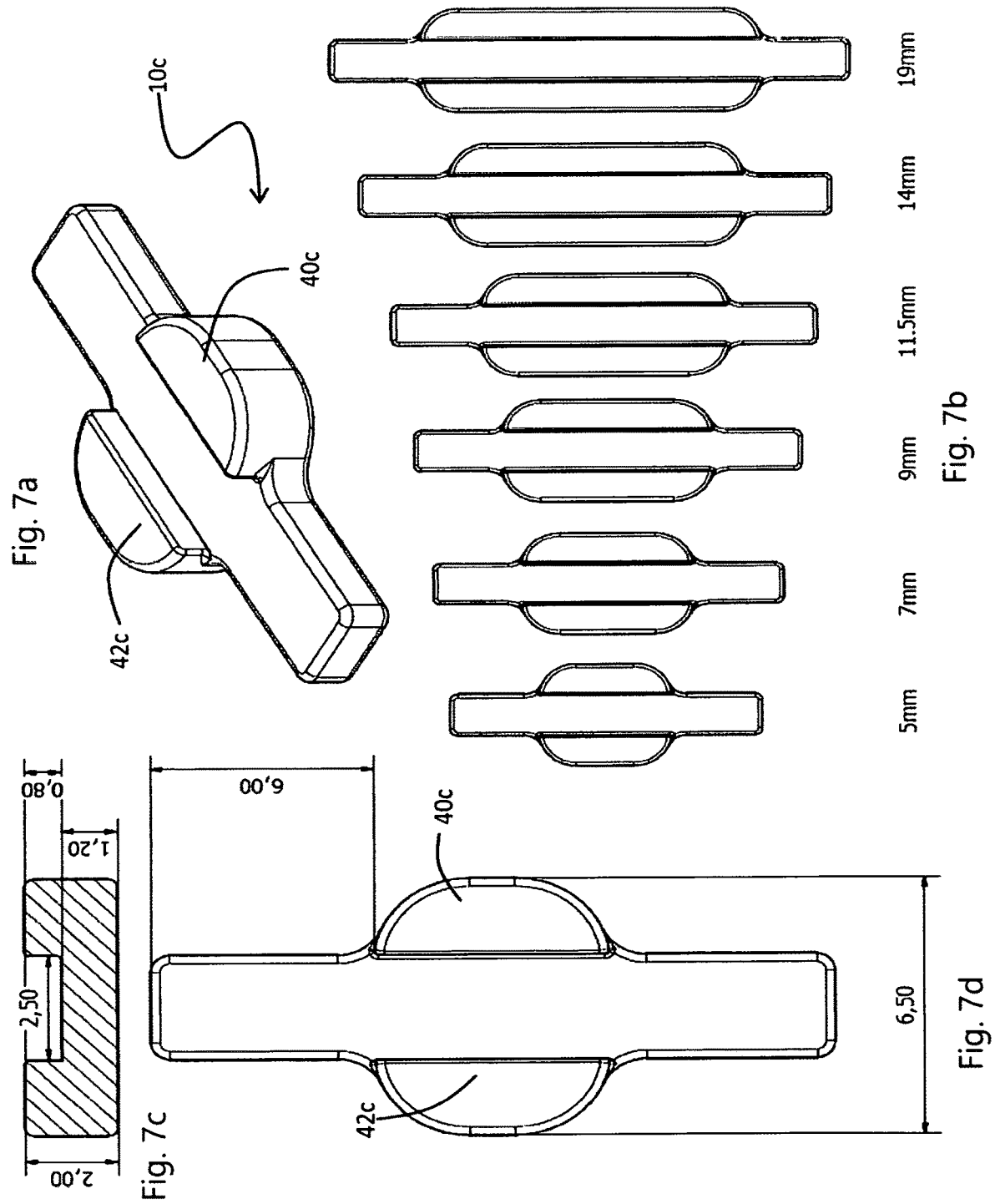

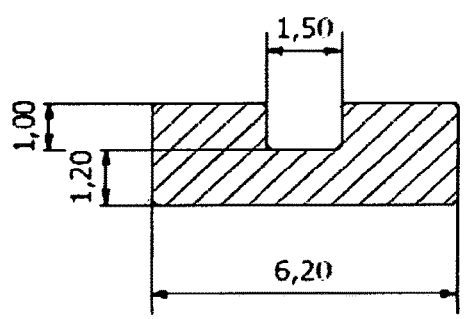
Fig. 8a1
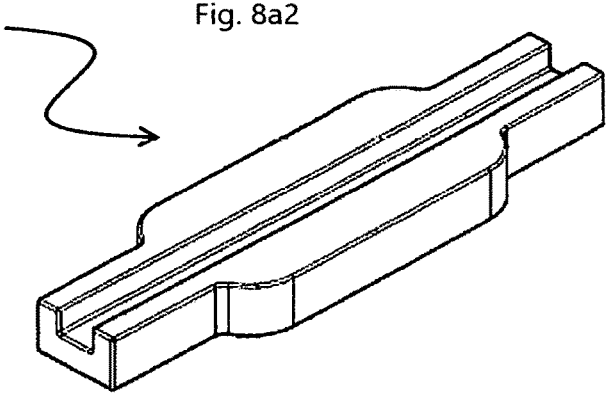
Fig. 8a2
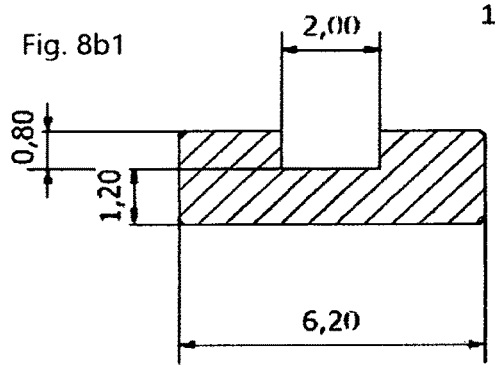
Fig. 8b1
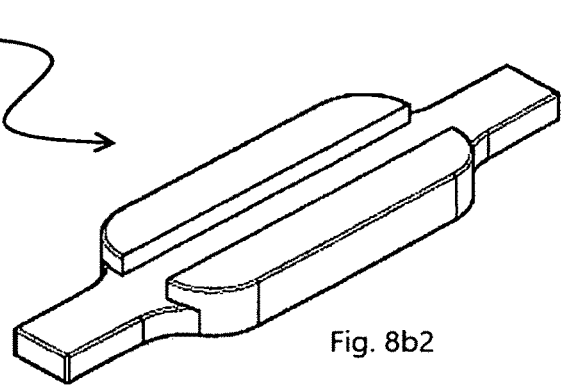
Fig. 8b2
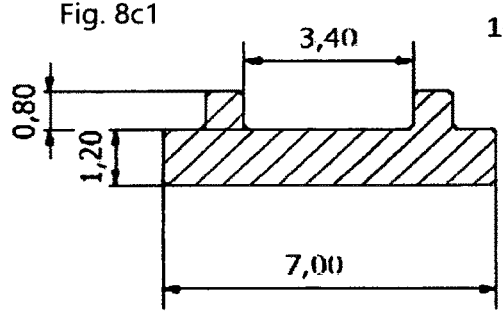
Fig. 8c1
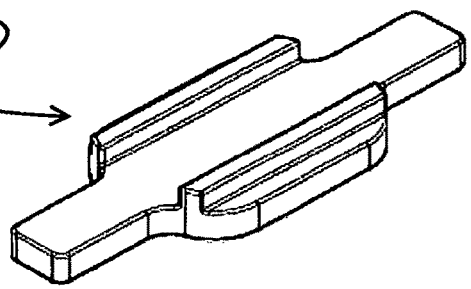
Fig. 8c2

FIGURE 9
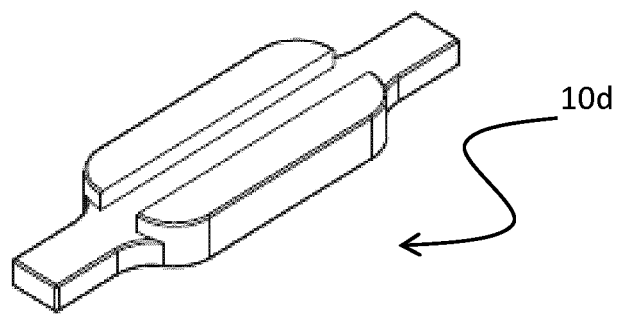
A
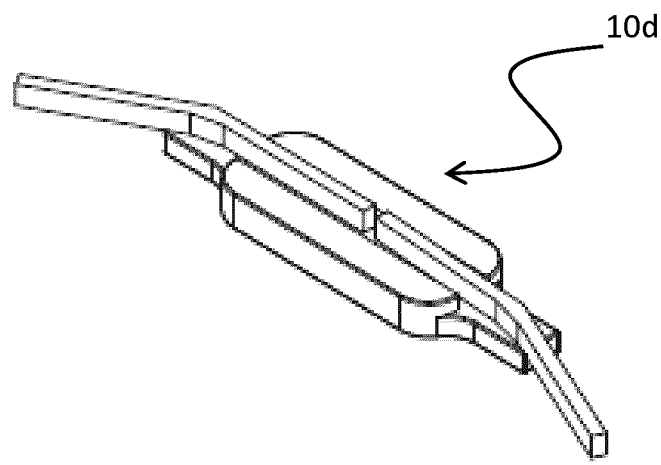
B
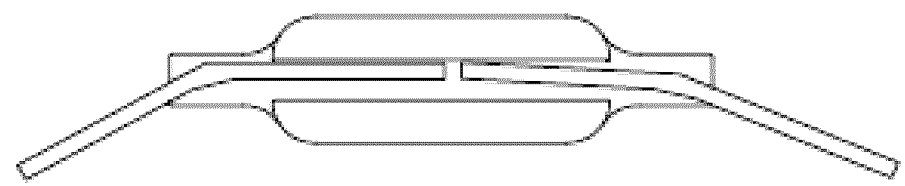
C

FIGURE 10
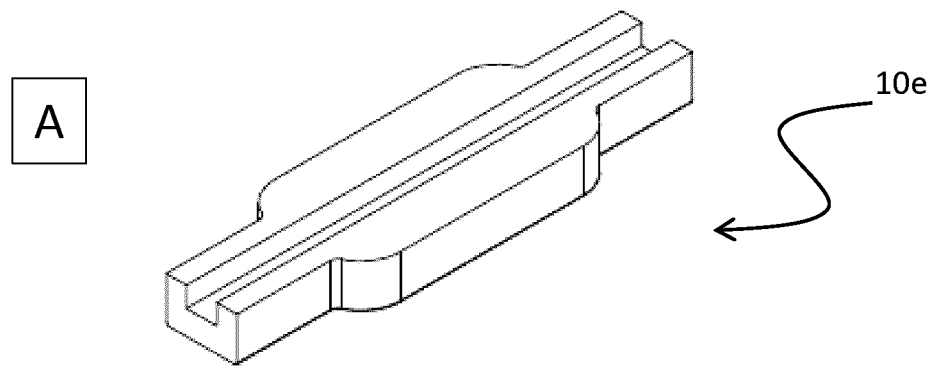
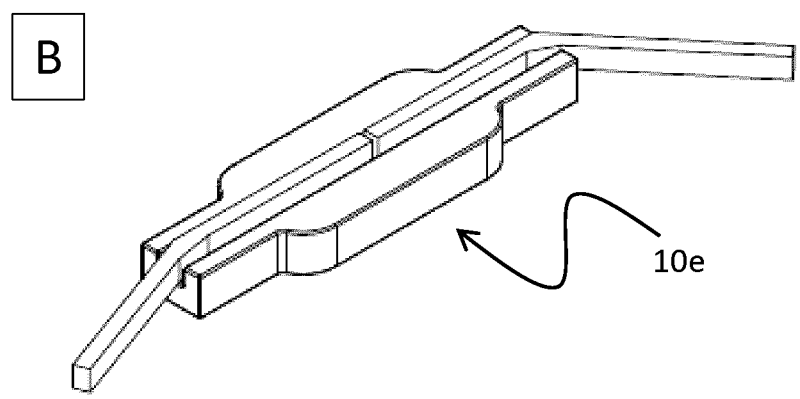
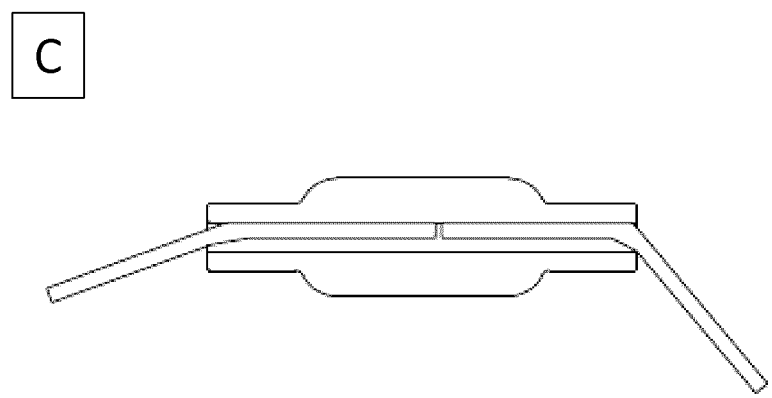

DIRECT DENTAL BRIDGE

CROSS REFERENCE TO RELATED APPLICATIONS

This application is the U.S. National Phase of International Application No. PCT/CA2016/050840, filed Jul. 15, 2016, designating the U.S. and published in English as WO 2017/008170 A1 on Jun. 26, 2014, which claims the benefit of U.S. Provisional Patent Application No. 62/231,732 filed Jul. 15, 2015, U.S. Provisional Patent Application No. 62/285,664 filed Nov. 5, 2015, U.S. Provisional Patent Application No. 62/386,919 filed Dec. 16, 2015 and U.S. Provisional Patent Application No. 62/389,993 filed Mar. 15, 2016.

BACKGROUND OF THE INVENTION

Field of the Invention

The present invention relates to dental restorations, and more particularly direct dental restorations to replace at least one missing tooth.

Description of the Related Art

If a single tooth, or less frequently two adjacent teeth are lost, and there are healthy teeth on either side of edentulous space created by the lost one or two teeth, then a fixed dental prosthesis called a bridge can be used to fill the edentulous space by fixing the prosthesis to the healthy teeth (termed abutment teeth) and placing a span containing artificial replacement teeth termed pontics between the abutment teeth.

Bridges can be indirect or direct bridges.

An indirect bridge is fabricated in a laboratory on an impression model of the patient's teeth. Once the indirect bridge is made in the laboratory, it is sent back to the dental office where the dentist cements it in place in the patient's mouth. An indirect bridge requires two visits to the dentist—a first visit to cut or grind abutment teeth and to make the impression model and a second visit to fix the indirect bridge made in the laboratory. Problems with indirect bridges include the financial cost of the bridge to the patient and cumulative time of the restoration with the two visit process requiring two sittings, two injections and time in the chair.

The cost for a laboratory fabricated bridge in industrialized countries is so high that the majority of citizens who lose a tooth cannot afford to have it replaced with a fixed laboratory fabricated bridge and as a result choose to leave the space without a tooth or teeth and attempt to chew and masticate with their remaining teeth.

A direct bridge is a bridge that is built directly on the healthy abutment teeth in the mouth of the patient. The objective of placing a bridge directly in the mouth is to save chair time and to cost the patient less money and also to cut less of the abutment tooth away when making the bridge. A direct bridge can often be fixed in a single visit to the dentist.

To create a bridge directly in the mouth, the dentist must install a reinforcement or framework that spans the abutment teeth and must create a pontic form to fill the edentulous space. Preformed bars or frameworks that decrease the amount of time needed to create the direct bridge provide a significant advantage to the dentist, as blood and saliva can egress onto the abutment teeth and edentulous space that need to be kept dry to optimize results.

Dental fibers have been used as low cost reinforcements for inexpensive direct bridges that most people can afford. The dental fibers were used as reinforcements spanning from abutment to abutment and placed within a pontic tooth to give the span strength against fracture forces of chewing. To make the direct bridge the dentist used composite resin filling materials with the fibers imbedded within the resin to build and create the pontic and bridge.

Yet despite the availability of these fibers, the majority of dentists around the world do not fabricate low cost fiber reinforced direct bridges. The reasons dentists do not provide these fiber reinforced direct bridges is that they do not provide a wide pontic support, are too difficult to cut to size, and are too time consuming to place in the mouth as a treatment upon which the dentist can effectively replace laboratory processed bridges.

Preformed bars or frameworks that span two abutment teeth have been previously described, for example in U.S. Pat. Nos. 4,457,714, 4,820,157, 4,894,012, 4,950,162, 5,772,438, 6,200,136, 6,039,569, 6,345,984 and U.S. Patent Application Publication Nos. 2004/0265782, 2006/0051723, 2007/0003904 and 2008/0096166.

However, despite the incredible demand and need and interest from dentists for direct bridges, no such preformed bar or framework has been commercially successful and widely adopted by dentists for use as a reinforcement for direct bridges.

Accordingly, there is a continuing need for alternative direct dental bridge devices and methods.

SUMMARY OF THE INVENTION

In an aspect there is provided a reinforcement bar combination for a direct dental bridge, the reinforcement combination comprising: first and second elongate bars, each of the first and second elongate bars contacting a single occlusal preparation formed in a single abutment tooth and each of the first and second elongate bars having an end positioned on a central pad of a third elongate bar to form a reinforcement scaffold.

In another aspect there is provided, a reinforcement bar combination for supporting a direct dental bridge, the reinforcement bar combination comprising:

an elongate proximal bar comprising a central planar pad/platform bound by a perimeter, a coronal oriented/facing surface and an apical oriented/facing surface, a first insertion arm extending in a mesial direction from the perimeter of the pad, a second insertion arm extending in a distal direction from the perimeter of the pad; a first vertical sidewall extending in a coronal direction from the coronal oriented surface of the pad; a second vertical sidewall extending in a coronal direction from the coronal oriented surface of the pad; and a first elongate torque bar receiving abutting support from less than the full longitudinal distance of the proximal bar; and a second elongate torque bar receiving abutting support from less than the full longitudinal distance of the proximal bar.

In still another aspect there is provided, a reinforcement bar combination for supporting a direct dental bridge, the reinforcement combination comprising:

an elongate proximal bar comprising:

a central planar pad bound by a perimeter, a coronal facing surface and an apical facing surface, a first insertion arm extending in a mesial direction from the perimeter of the pad, a second insertion arm extending in a distal direction from the perimeter of the pad;

a semi-tubular vertical extension extending in a coronal direction from the coronal facing surface of the pad with the longitudinal axis of the semi-tubular vertical extension aligned perpendicular to the pad; and an elongate torque bar having a first end positioned external to the proximal bar and having a second end contact and receive abutting support from a coronal surface of the pad.

In other aspects methods of use of the reinforcement combinations to produce a direct dental bridge are also provided.

BRIEF DESCRIPTION OF THE DRAWINGS

FIG. 1 shows (A) perspective, (B) top, and (C) lateral cross-section views of a proximal bar component of a reinforcement bar assembly for producing a direct dental bridge;

FIG. 2 shows (A) perspective, (B) top, and (C) lateral cross-section views of the proximal bar shown in FIG. 1 aligned with two torque bars to provide a reinforcement bar assembly for producing a direct dental bridge;

FIG. 4 shows results of a three-point bend test of a proximal bar.

FIGS. 5B1, 5B2, 5B3, 5B4 is a top view, a bottom view, an isometric top view and an isometric bottom view, respectively, of the proximal bar shown in FIG. 3E.

FIG. 6 shows a coronal surface view of a series of a plurality of the proximal bar variant shown in FIG. 1 that may be provided in a kit, the plurality of proximal bars arranged from left to right according to increasing longitudinal length.

FIG. 7a is an isometric view of a variant of the proximal bar.

FIG. 7b is a top view of a kit of different sized proximal bars.

FIG. 7c is a cross sectional view taken through parts 42c of the proximal bar shown in FIG. 7a and showing the various dimensions of the proximal bar.

FIG. 7d is a top view of the proximal bar shown in FIG. 7a and showing the various dimensions of the proximal bar.

FIG. 8a1 is a cross sectional view of a variant of the proximal bar.

FIG. 8a2 is an isometric view of the proximal bar shown in FIG. 8a1.

FIG. 8b1 is a cross sectional view of another variant of the proximal bar.

FIG. 8b2 is an isometric view of the proximal bar shown in FIG. 8b1.

FIG. 8c1 is a cross sectional view of another variant of the proximal bar.

FIG. 8c2 is an isometric view of the proximal bar shown in FIG. 8c1.

FIG. 9 shows (A) an isometric view of yet another variant of the proximal bar, (B) an isometric view of the variant proximal bar in combination with two bent torque bars, and (C) a coronal surface view of the variant proximal bar in combination with two bent torque bars.

FIG. 10 shows (A) an isometric view of yet a further variant of the proximal bar, (B) an isometric view of the variant proximal bar in combination with two bent torque bars, and (C) a coronal surface view of the variant proximal bar in combination with two bent torque bars.

DETAILED DESCRIPTION OF PREFERRED EMBODIMENTS

Figure 3:
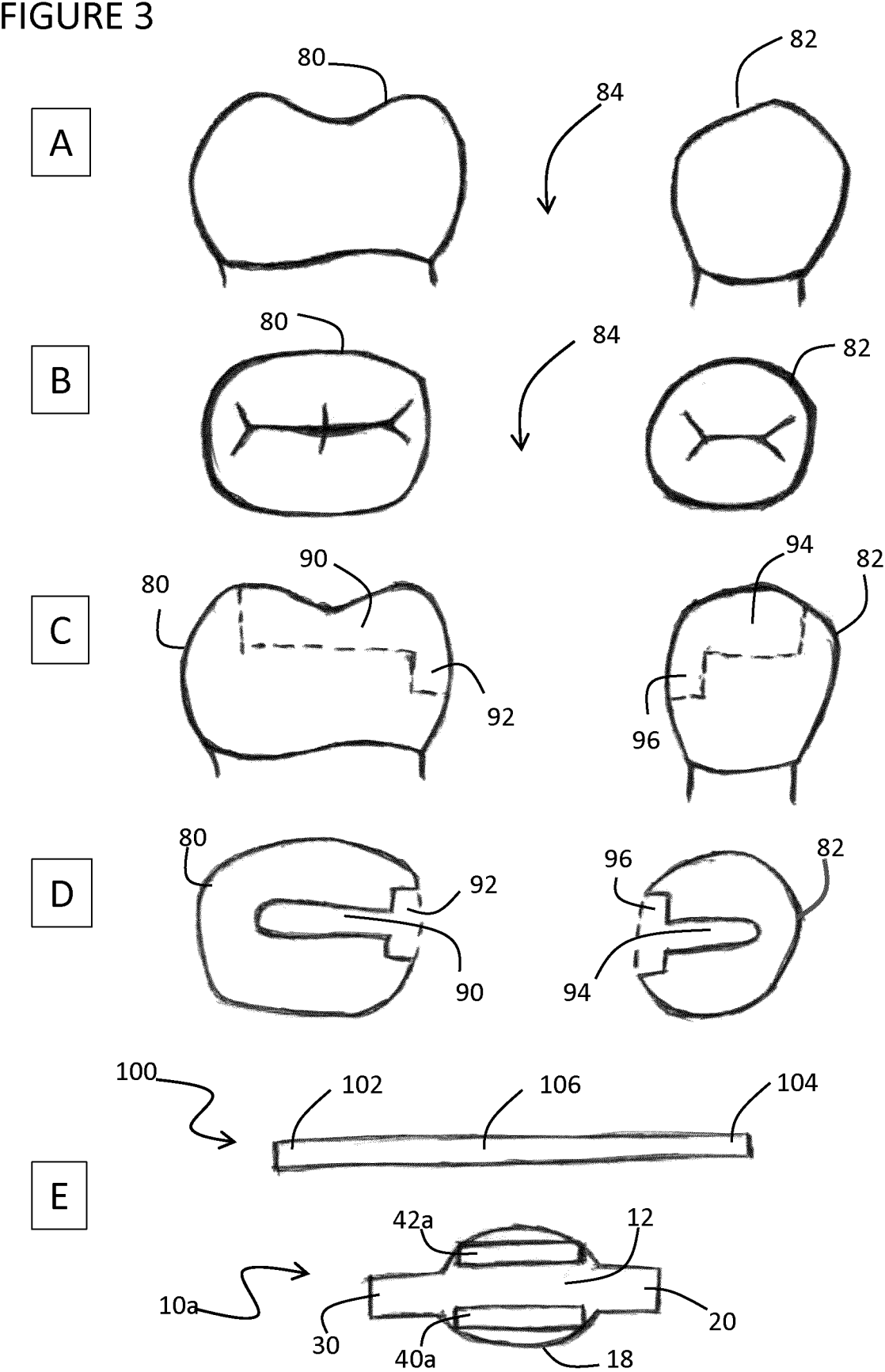
FIG. 3 shows a sequence of views (A to Q) schematically illustrating experimental development of the reinforcement bar assembly shown in FIG. 2.
Figure 3:
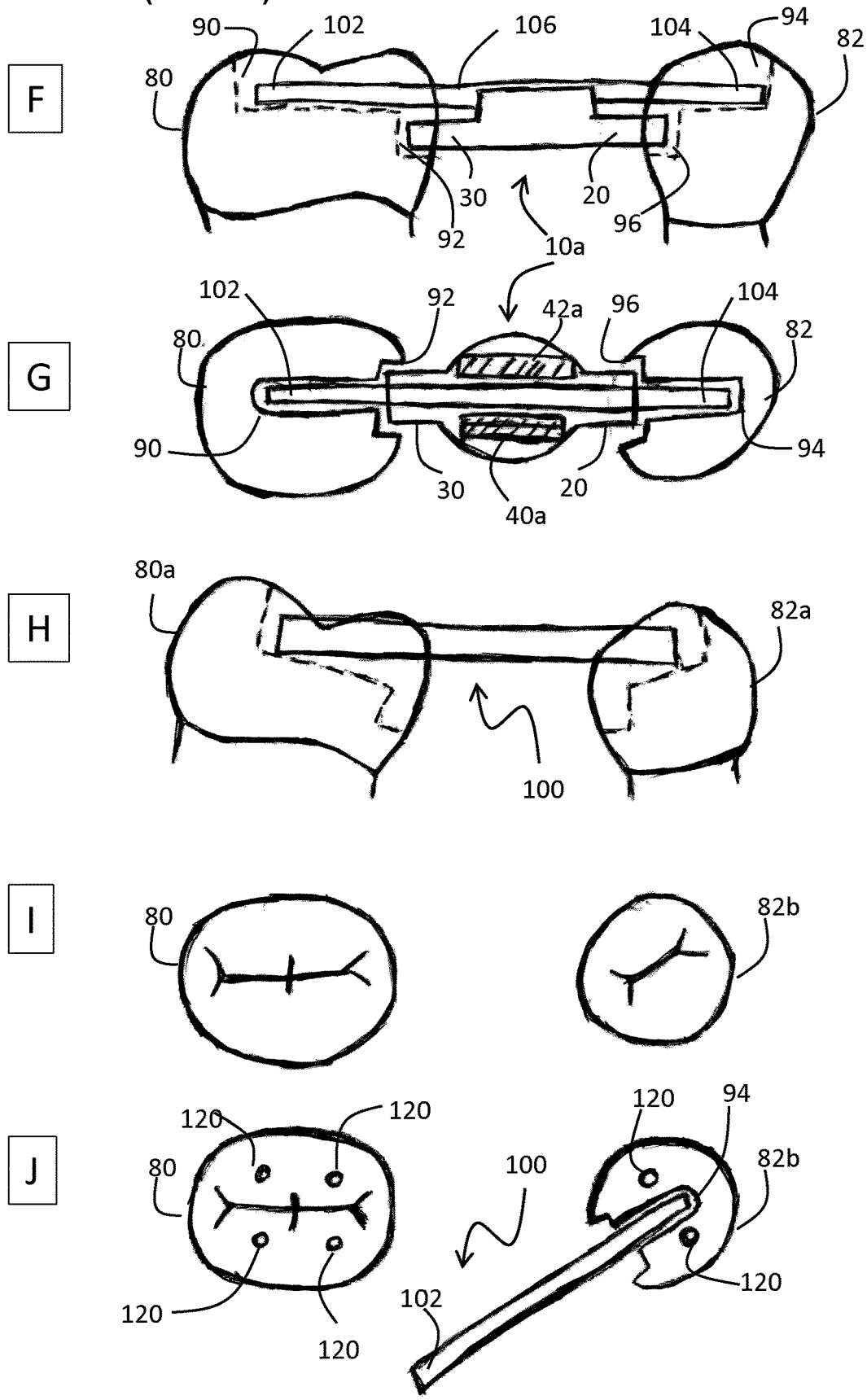
Figure 3:
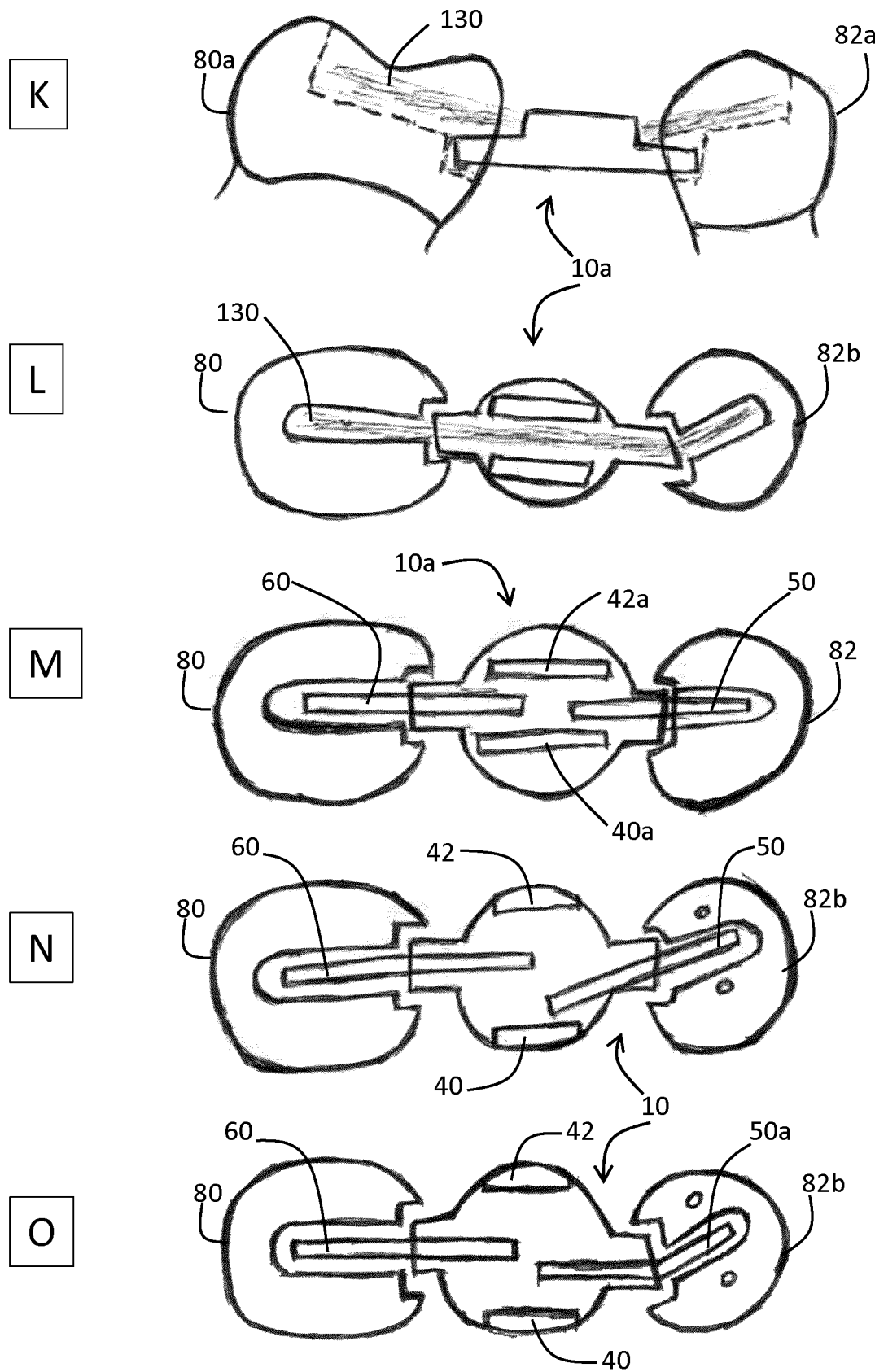

Now referring to the drawings, devices and methods for creating a direct dental bridge to replace at least one missing tooth are described. The direct dental bridge can be used to replace a missing posterior tooth or a canine anterior tooth. Posterior teeth are premolars (also called bicuspids) and molars, as compared to incisors and canines, which are anterior teeth.

FIG. 1 shows (A) perspective, (B) top, and (C) lateral cross-section views of a proximal bar 10 of a reinforcement bar assembly for supporting a direct dental bridge. The proximal bar is an elongate structure having a longitudinal axis that is oriented in a mesiodistal direction when producing the direct dental bridge. A mesial direction is towards the anterior midline in a dental arch, while a distal direction is towards the tooth furthest from the anterior midline (ie., a direction towards a wisdom tooth) in each quadrant. Each tooth includes a mesial surface and a distal surface. When producing the direct dental bridge the proximal bar 10 spans a first cavity preparation in a distal surface of a mesial abutment tooth to a second cavity preparation in the mesial surface of a distal abutment tooth. Facing mesial and distal surfaces of adjacent teeth are generally referred to as proximal surfaces. Accordingly, the corresponding first and second cavity preparations in facing distal and mesial surfaces of the abutment teeth can be more generally referred to as first and second cavity preparations in the proximal surfaces of the abutment teeth, and proximal bar 10 is sized longitudinally to span the first and second cavity preparations and the edentulous space therebetween. First and second cavity preparations in the proximal surfaces of the abutment teeth may also be referred to as distal and mesial proximal preparations, respectively.

The proximal bar 10 comprises a central planar pad 12 bound by a first surface 14 and an opposing second surface 16 joined at a perimeter 18. The first surface 14 is generally parallel to the second surface 16. When creating the direct dental bridge the first surface 14 and the second surface 16 are both aligned transverse to a coronoapical axis of at least one abutment tooth with the first surface 14 facing a coronal direction and the second surface 16 facing an apical direction.

A first insertion arm 20 extends horizontally from the perimeter 18 of the central planar pad 12. The first insertion arm 20 has a first end 22 that is integrally connected to the perimeter 18 of the central planar pad 12 and a second end 24 that is free to be inserted or fit within a cavity preparation in a proximal surface of an abutment tooth. The first insertion arm 20 is substantially co-planar with the central planar pad 12. When producing the direct dental bridge the first insertion arm 20 extends in a mesial direction from the perimeter 18 of the central planar pad 12 so that a portion of the first insertion arm 20 at or near its second end 24 fits and finds abutting support within a cavity preparation within the proximal surface (the distal surface) of the mesial abutment tooth.

A second insertion arm 30 extends horizontally from the perimeter 18 of the central planar pad 12. The second insertion arm 30 has a first end 32 that is integrally connected to the perimeter 18 of the central planar pad 12 and a second end 34 that is free to be inserted or fit within a cavity preparation in a proximal surface of an abutment tooth. The second insertion arm 30 is substantially co-planar with the central planar pad 12 and with the first insertion arm 20. When producing the direct dental bridge the second insertion arm 30 extends in a distal direction from the perimeter 18 of the central planar pad 12 so that a portion of the second insertion arm 30 at or near its second end 34 fits and finds abutting support within a cavity preparation within the proximal surface (the mesial surface) of the distal abutment tooth.

A first vertical extension 40 extends substantially vertically from and substantially perpendicularly to the first surface 14 of central planar pad 12. The first vertical extension 40 is substantially co-extensive with the central planar pad 12 along its longitudinal dimension. When producing the direct dental bridge the first vertical extension extends in a coronal direction from the first surface 14 or coronal facing surface of the central planar pad 12.

A second vertical extension 42 extends substantially vertically from and substantially perpendicularly to the first surface 14 of central planar pad 12. The second vertical extension 42 is substantially co-extensive with the central planar pad 12 along its longitudinal dimension. When producing the direct dental bridge the second vertical extension 42 extends in a coronal direction from the first surface 14 or coronal facing surface of the central planar pad 12.

The vertical extensions, shown in FIG. 1, function as vertical walls of vertical sidewalls and therefore the term vertical extension may be used interchangeably with the terms vertical wall or vertical sidewall.

The first vertical sidewall 40 and the second vertical sidewall 42 are substantially co-extensive and substantially parallel and are symmetrically positioned with reference to a longitudinal line of symmetry of the central planar pad 12. The first and second vertical sidewalls have a lateral spacing greater than the width of the first and second horizontal insertion arms. The first and second vertical sidewalls combine with the first surface 14 of the central planar pad 12 to form a channel or trough with a U-shaped lateral cross-section providing an open trough defining first and second open longitudinal ends that are contiguous and communicative with first and second insertion arms, respectively.

The proximal bar 10 only inserts into the cavity preparation in the proximal surfaces of the abutment teeth from about 1 mm to about 2 mm. Therefore, the proximal bar cannot be relied upon to resist torque or twisting forces that may be exerted upon a dental bridge structure.

To provide reinforcement of a dental bridge against fracture due to torque or twisting forces two torque bars are aligned with the proximal bar and abutment teeth with each torque bar extending from within an occlusal cavity preparation of the abutment tooth to within and between the first and second vertical sidewalls of the proximal bar 10.

FIG. 2 shows (A) perspective, (B) top, and (C) lateral cross-section views of the proximal bar shown in FIG. 1 aligned with two torque bars to provide a reinforcement bar assembly for producing a direct dental bridge.

A first elongate torque bar 50 is a straight bar having at least one longitudinal flat side for abutting support from the first insertion arm 20 and a portion of the coronal facing surface of the central planar pad 12. The first elongate torque bar 50 is defined by a first free end section 52 for contact with and receiving abutting support from an occlusal cavity preparation of a mesial abutment tooth, a central body section 54 for contact with and receiving abutting support from the first insertion arm 20, and a second free end section 56 for contact with and receiving abutting support from the central planar pad 12. The first and second vertical sidewalls act as guards or walls to constrain angular motion the first elongate torque bar 50. Typically, the first elongate torque bar 50 is aligned with the proximal bar 10 so that it overlaps with less than the full longitudinal distance of the coronal facing surface of the central planar pad 12.

A second elongate torque bar 60 is a straight bar having at least one longitudinal flat side for abutting support from the second insertion arm 30 and a portion of the coronal facing surface of the central planar pad 12. The second elongate torque bar 60 is defined by a first free end section 62 for contact with and receiving abutting support from an occlusal cavity preparation of a distal abutment tooth, a central body section 64 for contact with and receiving abutting support from the second insertion arm 30, and a second free end section 66 for contact with and receiving abutting support from the central planar pad 12. The first and second vertical sidewalls act as guards to constrain angular motion the second elongate torque bar 60. Typically, the second elongate torque bar 60 is aligned with the proximal bar 10 so that it overlaps with less than the full longitudinal distance of the coronal facing surface of the central planar pad 12.

The first and second elongate torque bars can be positioned in varied longitudinal overlap with the proximal bar depending on the requirements of a direct restoration as angles or alignment of occlusal cavity preparation and edentulous space may be specific to each direct dental bridge restoration. The first and second elongate torque bars can be independently positioned to longitudinally overlap the proximal bar, where each of the first and second torque bars is independently limited to a longitudinal overlap that is less than the full longitudinal distance of the proximal bar, more typically independently limited to a longitudinal overlap that is less than 80% of the full longitudinal distance of the proximal bar, the full longitudinal distance of the proximal bar being the longest distance from a free end of the first horizontal insertion arm to a free end of the second horizontal insertion arm. The first and second elongate torque bars can be independently positioned to overlap one of the first or second insertion arms and the central planar pad, but limited to a longitudinal overlap that is less than the full longitudinal distance of the proximal bar. Each of the first and second elongate torque bars can independently overlap with any portion of the longitudinal distance of the coronal facing surface of the central planar pad 12. Typically, the first elongate torque bar longitudinal overlap is confined to the first insertion arm and the central planar pad so that the first elongate torque bar contacts and receives abutting support from the first insertion arm and the central planar pad, but not the second insertion arm. Typically, the second elongate torque bar longitudinal overlap is confined to the second insertion arm and the central planar pad so that the second elongate torque bar contacts and receives abutting support from the second insertion arm and the central planar pad, but not the first insertion arm.

The first and second elongate torque bars can be varied in angular orientation to and longitudinal overlap with the proximal bar depending on the requirements of a direct restoration as angles or alignment of occlusal cavity preparation and edentulous space may be specific to each direct dental bridge restoration. Angular orientation of each of the first and second torque bar can independently deviate up to about 60 degrees from the longitudinal axis of the proximal bar and up to about 20 degrees from the plane of the coronal facing surface of the proximal bar. The first and second vertical sidewalls of the proximal bar 10 act as guards or walls to limit angular orientation of the first and second elongate torque bars when installing a reinforcement bar assembly. The first and second vertical sidewalls can also act as guards or walls to constrain angular motion of the first and/or second elongate torque bars, with the vertical sidewalls providing a resistive force when torque or twisting forces are exerted upon a direct dental bridge.

FIG. 3 shows a sequence of views (A to P) schematically illustrating experimental development of the reinforcement bar assembly shown in FIG. 2.

FIG. 3A shows the side view of crowns of a molar 80 on the left and a bicuspid tooth 82 on the right and an edentulous space 84 in between. The molar 80 and bicuspid 82 teeth are termed abutments or abutment teeth. The molar 80 is the distal abutment tooth and the bicuspid 82 is the mesial abutment tooth. An edentulous space is a space where a natural tooth is missing and extends between the proximal surfaces of the abutment teeth.

FIG. 3B shows a top view (coronal view) of the same two abutment teeth shown in FIG. 3A—the molar 80 and the bicuspid 82. A reinforcement bar assembly that spans the edentulous space 84 can be used to reinforce composite resin in such a manner that the composite resin can be used to produce a permanent composite resin direct dental bridge replacing the missing tooth with a replacement tooth called a pontic.

FIG. 3C shows a side view of proximal and occlusal cuts, also called preparations, into the abutment teeth. A distal occlusal cavity preparation 90 and a distal proximal cavity preparation 92 are formed in the molar 80, while a mesial occlusal cavity preparation 94 and a mesial proximal cavity preparation 96 are formed in the bicuspid 82. Occlusal and proximal preparations are cut by a dentist using a rotary tool such as a dental drill actuating rotation of a suitable dental burr.

FIG. 3D shows a top view (coronal view) of the proximal and occlusal cuts, also called preparations, into the abutment teeth. Each proximal and occlusal cuts receives an end portion of a reinforcement bar. A combination or assembly of reinforcements bars supports application and shaping of composite resin to form a direct dental bridge to span and fill the edentulous space 84. The reinforcement bar assembly provides a framework or scaffold to reinforce the composite resin and support a prosthetic tooth called a pontic which replaces the missing tooth.

FIG. 3E shows a top view (coronal view) of a reinforcement bar combination that was cut to a suitable size and shape and used to make the direct dental bridge for patients. The reinforcement bar combination comprises a single occlusal bar 100 and a single proximal bar 10a. The occlusal bar 100 is a long straight bar that is cut by the dentist to span the longitudinal distance between distal and mesial occlusal preparations (90, 94), the occlusal bar 100 having a first end 102 that is received in distal occlusal preparation 90, a second end 104 that is received in mesial occlusal preparation 94, and a central portion 106 that receives abutting support the proximal bar 10a. The proximal bar 10a shown in FIG. 3E is a modification of the proximal bar 10 shown in FIG. 1 with both the first vertical sidewall 40a and the second vertical sidewall 42a laterally offset from the perimeter 18 of the central planar pad 12. The proximal bar 10a has the first and second vertical sidewalls, 40a and 42a, situated closer to the longitudinal line of symmetry of the proximal bar 10 so as to provide a grip on the occlusal bar to better support or resist torque forces applied to the dental bridge and transferred to the occlusal bar. The reinforcement bar combination shown in FIG. 3E requires that the direct bridge comprise a single proximal bar and a single occlusal bar extending from abutment tooth to abutment tooth.

The purpose of the occlusal bar spanning mesial to distal occlusal preparations is to provide additional support and reinforcement for the pontic tooth against occlusal forces directed to the pontic. The occlusal bar provides this support by being simultaneously fixed in the occlusal preparations of both the abutment teeth and spanning through the pontic to give the pontic strength against fracture.

The purpose of the occlusal bar and the proximal bar being used together was to use the strength of the combination of the two bars to provide the strength to the pontic.

FIG. 3F shows a side view and FIG. 3G shows a top view of the occlusal bar 100 and the proximal bar 10a sized and placed to fit into the occlusal and proximal preparations, respectively, cut in the abutment teeth. Case studies and experiments have shown that the reinforcement bar combination as shown in FIGS. 3F and 3G can be successfully used for abutment teeth that are aligned with each other. However, in practice many teeth that serve as abutments are either tipped or rotated. FIGS. 3H, 3I and 3G show examples of tipped and rotated teeth from which it is apparent that the reinforcement bar combination of occlusal and proximal bars as shown in FIGS. 3F and 3G cannot function as intended since the occlusal bar 100 cannot be aligned to sit within both mesial and distal occlusal preparations.

FIG. 3H shows a tipped molar 80a abutment tooth and a tipped bicuspid 82a abutment tooth. The occlusal bar 100 cannot sit in the distal and mesial occlusal preparations as intended due to the tipping of the abutments.

FIG. 3I shows an ideal alignment molar 80 abutment tooth and a rotated bicuspid 82b abutment tooth.

FIG. 3J shows the position of the nerve pulp horns 120 as the small circles in the bicuspid and molar abutment teeth. FIG. 3J also shows that the occlusal preparation in any abutment has to be cut down the center of the tooth between the pulp horns 120 to avoid hitting the pulp horn 120 of the nerve when cutting the tooth. FIG. 3J also shows the straight occlusal bar 100 in place in the mesial occlusal preparation 94 of the bicuspid showing how it would be positioned in the mesial occlusal preparation 94 causing an alignment problem for the occlusal bar 100 with respect to molar 80 making it difficult to be used in a direct bridge.

Experimentation and attempts to employ the occlusal bar to reinforce direct bridges in the mouth has established that the occlusal bar inserted into and spanning from mesial occlusal preparation to distal occlusal preparation cannot be employed in many cases due to even slight tipping and rotation of the teeth out of and away from a perfect straight line.

The straight line available in real life between two abutment teeth is determined by the position of the nerves in the abutment teeth and the nerve horns sticking up into the cuspal areas of the abutment teeth. These pulp horns dictate the width of each occlusal preparation and the direction of the line of the occlusal preparation and thus the positioning of the occlusal bar and the straight line or longitudinal axis position of the occlusal bar when placed within these preparations.

Experiments and case studies involving numerous attempts to place a single occlusal bar from abutment tooth to abutment tooth in the mouth of patients to build direct bridges led to the discovery that the straight line direction of each of the occlusal preparations are so tightly defined by the pulp horns that it is rare in the mouth that the straight line direction of the occlusal preparations of both abutment teeth will be lined up so precisely that a single occlusal bar can be placed in both occlusal preparations simultaneously to span the edentulous space and sit in each occlusal preparation and provide a suitable reinforcement.

Since the straight occlusal bars could not be used in the vast majority of direct bridges, attempts were made to fabricate direct bridges in the mouth using bendable fibers. Fibers could be used to reinforce a direct bridge with the proximal bar as the fibers could bend and twist to fit the directions of the available occlusal preparations of each abutment and through the channel or trough defined by vertical sidewalls of the proximal bar.

Therefore, to overcome the problems of tipped and rotated teeth experiments were conducted using bendable fibers as occlusal reinforcements in combination with the proximal bar 10a instead of a straight and ridged occlusal bar 100.

FIGS. 3K and 3L show the proximal bar 10a in place in mesial and distal preparations and bendable fibers 130 used as an occlusal bar to adapt to the occlusal preparations of tipped and rotated teeth and also inserted between the vertical sidewalls of the proximal bar 10a to reinforce a direct bridge.

Ribbond (polyethylene), Fiber-Kor, Splint-It from Pentron Corporation and E-Fiber from Preat Corporation (fiber glass) which are commercially available to dentists, were tested for use as the bendable fiber occlusal bar 130 in combination with the proximal bar 10a for producing a direct dental bridge. This technique of direct dental bridge construction using fibers as the occlusal bar was functional and the bridging and reinforcing are successful, but problems and disadvantages of using fibers were observed.

An example of a problem observed by using bendable fibers is that polyethylene fibers are not reliably strong because the dentist had to impregnate the polyethylene fibers with dental resin chair side and could not reliably and consistently achieve complete impregnation and thorough wetting of these fibers.

Another problem with using bendable fibers to replace the occlusal bar was difficulty in compacting and placing and curing the fibers to lay flat in the bottom (ie., along the apical or gingival surface) of the occlusal preparations and within the space between the first and second vertical sidewalls of the proximal bar. The fibers tended not to lay down and they were difficult to manage and cure exactly where they are desired to be in the bottom of the occlusal preparations. The fibers would extend up into the occlusal surface so that when the bridge is completed the fibers are exposed and part of the occlusal surface. More specifically, experiments with glass fibers (which were chosen for being stronger more reliable than polyethylene fibers) revealed that these glass fibers are difficult to work with and difficult to push into place and cure in place in the occlusal preparations.

Another problem with using bendable fibers is that since the fibers are not easily controlled to lay flat in the occlusal preparations and are in or close to the the occlusal surface the fibers are at risk of being more exposed as the patient uses the bridge and wears down the composite resin.

Faced with the above problems with using the bendable fibers, further experimentation of reinforcement bar combinations were conducted. Case studies showed that the proximal bar 10a was actually supporting the pontic on its own very well.

Furthermore, three-point bend tests of the proximal bar 10a independently conducted by Acuren Materials Testing found the proximal bars were able to withstand over 150 lbs of occlusal force before breaking. FIG. 4 shows the results of the proximal bar three-point bend tests conducted by Acuren, Moreover, case studies confirmed that the proximal bar was more than adequately strong to withstand the occlusal forces applied to it. Therefore, the concept that combination of 2 reinforcement bars—a proximal bar and an occlusal bar—acting together to resist occlusal forces, where the occlusal bar is a continuous fiber from mesial occlusal preparation to distal occlusal preparation may not be needed or necessary for resisting occlusal forces.

Therefore, experiments established that the concept of a single occlusal bar or fiber span reinforcement spanning from mesial occlusal preparation to distal occlusal preparation to assist in the resisting of occlusal forces to provide a combined strength with the proximal bar may be eliminated.

However, the proximal bar only inserts into the abutment tooth about 1 mm and therefore the proximal bar cannot be relied upon to resist torque or twisting forces at the join or isthmus between the pontic and the abutment tooth. Thus, further analysis established that while eliminating a reinforcement structure that spanned from occlusal preparation to occlusal preparation may not critically reduce resistance to occlusal forces, it could leave torque forces placed across the isthmus of where the pontic joins the abutment tooth without sufficient resistance.

Without wishing to be bound by theory, based on recognition that the proximal bar sufficiently withstands occlusal forces but cannot be relied upon to sufficiently resist torque or twisting forces at the isthmus, a hypothesis was developed that the occlusal bar can function as a reinforcement against fracture due to torque or twisting forces at the isthmus between the pontic and the abutment tooth. The hypothesis was further developed to investigate replacement of the single occlusal bar with two shorter bars. Case studies have shown that the function of the single occlusal bar can be accomplished by two separate short occlusal bars at each end of the direct bridge. More specifically, case studies established that resisting torque forces across the isthmus could be accomplished with two separate short ceramic bars that extended between the occlusal preparation of one abutment to and into the trough or channel defined by vertical sidewalls of the proximal bar. Again, without wishing to be bound by theory, twisting or torque forces could be successfully resisted by each of the two short occlusal bars which extended from within the occlusal preparation of the abutment tooth to within and between the vertical sidewalls of the proximal bar. Since these short occlusal bars are believed to counter or resist torque forces, these bars are called torque reinforcement bars or torque bars.

Torque bars can come in different sizes depending on the size of the abutment tooth it is placed into. For example, lateral cross-section dimensions for a torque bars for a molar may be 1.6 mm by 1.0 mm and for a bicuspid may be 1.2 mm by 1.0. Thus, torque bars may be categorized in kits as molar torques bars and bicuspid torque bars, with molar torque bars typically having a greater lateral cross-sectional area than bicuspid torque bars. Lateral cross-sectional shapes of torque bars may be varied including circular, trapezoid and other polygonal shapes.

FIG. 3M shows a top view (coronal view) of the proximal bar 10a and the first elongate torque bar 50 and the second elongate torque bar 60 configured and positioned in proximal and occlusal cuts of ideally aligned molar 80 and bicuspid 80 abutment teeth. However, this combination of reinforcement bar configuration and arrangement between two abutment teeth so that both occlusal preparation and both proximal preparation are co-aligned and parallel is not frequent clinically. Rather one or both abutment teeth being tipped or rotated presents much more frequently in practice. In order to accommodate a range of angular orientations of misaligned abutment teeth and consequent angular orientations of a straight elongate torque bar relative to a proximal bar, the lateral spacing between the first and second vertical sidewalls can be increased to a lateral spacing shown for proximal bar 10 in FIG. 3N or FIG. 1, for example, as compared to the lateral spacing shown for proximal bar 10a in FIG. 3M, for example. As the lateral spacing between the vertical sidewalls of the proximal bar is increased the torque bars can fit between the vertical sidewalls in numerous cases of small irregularities of orientation that are so common in abutment teeth.

FIG. 3N shows the vertical sidewalls of the proximal bar moved to the furthest lateral position possible on the proximal bar 10—the first and second vertical sidewalls, 40 and 42, are located at opposing lateral sides of the perimeter 18 of the central planar pad 12. FIG. 3N shows that by spacing the vertical sidewalls laterally a straight elongate torque bar 50 can be used to fit between the vertical sidewalls with a range of angular orientations and thus be used to strengthen the isthmus against torque forces even when an abutment tooth is rotated from an ideal alignment, for example rotated bicuspid 82b. Depending on the degree of rotational deviation from ideal alignment of an abutment tooth, a bent torque bar may be provided to accommodate the rotational deviation. In cases where the abutment tooth is severely rotated, the torque bar can be provided in a variety of bent shapes to be selected as needed by the particular rotation of the abutment tooth.

FIG. 3O shows a bent elongate torque bar 50a being used to provide reinforcement at the isthmus when configuring a three bar reinforcement combination for a severely rotated abutment tooth, such as rotated bicuspid 82b.

Tipped and rotated teeth, especially tipped molars, are very common. Torque bars can be prefabricated in a variety of angles so that they can used in cases of tipped and rotated teeth.

FIG. 3P shows the bent torque bar 60a used for a tipped molar 80a.

Torque bars can be provided in sets of multiple types of bars, including straight bars and a variety of bent bars where the dentist can select the angle of the torque bar bend that best suits the alignment of the abutment teeth.

FIG. 3Q shows a longitudinal end cross-section view of a proximal bar 10b and torque bar 60b where the vertical sidewalls 40b, 42b are to the furthest lateral position possible on the proximal bar 10b and the inner surfaces of the vertical sidewalls are angled inwards to form a dovetailed trough. FIG. 3Q also shows the torque bar 60b is widest at the base and while the torque bar sits loosely between the vertical sidewalls before application of composite resin, once the composite resin is applied and cured to form a direct bridge, the composite resin surrounding the torque bar will apply forces to the dove tailed angles of the vertical sidewalls during an application of force to the direct bridge. Proximal bar 10b differs from proximal bar 10 in that a lateral cross-section of the trough formed by the first and second vertical sidewalls of proximal bar 10b shows a dovetailed shape. Elongate torque bar 60b differs from elongate torque bar 60 in its lateral cross-section shape, the lateral cross-section of torque bar 60b having an acute trapezoid shape, and more specifically an isosceles trapezoid shape to match the dovetailed trough of proximal bar 10b.

Experiments illustrated in FIG. 3 have established a clear advantage of using two torque bars instead of a single occlusal bar to provide reinforcement for rotated or tipped abutment teeth.

Another advantage of using two torque bars instead of a single occlusal bar is that the torque bars can be provided in different sizes for different abutment teeth. A molar is larger than a bicuspid and so a larger stronger torque bar can be provided for a molar, for example with dimensions of a rectangular bar 1.6 mm wide and 1.2 mm high. The bicuspid bar would be smaller, for example 1.2 mm wide by 1.2 mm high. The torque bars need to be long enough to extend far into the occlusal preparation of the abutment tooth and then extend into the trough of the proximal bar, for example to about the middle of the proximal pad.

Another advantage of using two torque bars instead of a single occlusal bar is that it allows for bent torque bars to be provided to fit into occlusal preparations of tipped and severely rotated teeth so that when these cases are found in the mouth a dentist can place a torque bar that sits flat in the floor of the occlusal preparation and bends at the isthmus and then extends along flat surface of the proximal bar to between the vertical sidewalls.

Proximal bars and torque bars can be sold in a kit to the dentist or a manufacturer can make them and stock them to be ordered as needed.

A kit may include proximal bars with wide pads to support the pontic and with sufficiently spaced apart vertical sidewalls being manufactured and provided for the dentist in a kit of increments of length, as shown for example in FIGS. 6 and 7. For example, a plurality of proximal bar sizes may be provided in a kit for use including proximal bars with pads of varied horizontal length including for example 4 mm, 5 mm, 6 mm, 7 mm, 8 mm etc to 25 mm. In cases of long spans proximal bars may be made with slight variations to increase the strength needed for longer spans, ie. proximal bars of pad length greater than 10 mm. These variations may include, for example, increased thickness of the proximal bar and or additional longitudinal ribs placed along the length under the proximal pad towards the gingiva.

A kit may include torque bars of sizes for molar torque bars and of sizes for bicuspid torque bars that can be provided for the dentist to cut to length for placement in each proximal bar and pontic combination where the dentist can select the torque bar for either the molar or bicuspid depending on the abutment tooth.

A kit may include bent torque bars to be used in cases of tipped abutments and cases where the width of the vertical sidewalls of the proximal bar and the direction of the torque bar determined by the pulp horns of the abutment teeth do not accommodate the straight torque bar due to the more than normally experienced rotation and of the abutment teeth. The kit may include a plurality of torque bars having different bend angles as shown for example in FIG. 11.

Several illustrative variants have been described above. Further variants and modifications are described below. Moreover, guiding relationships for configuring variants and modifications are also described below. Still further variants and modifications are contemplated and will be recognized by the person of skill in the art.

Figure 5A:
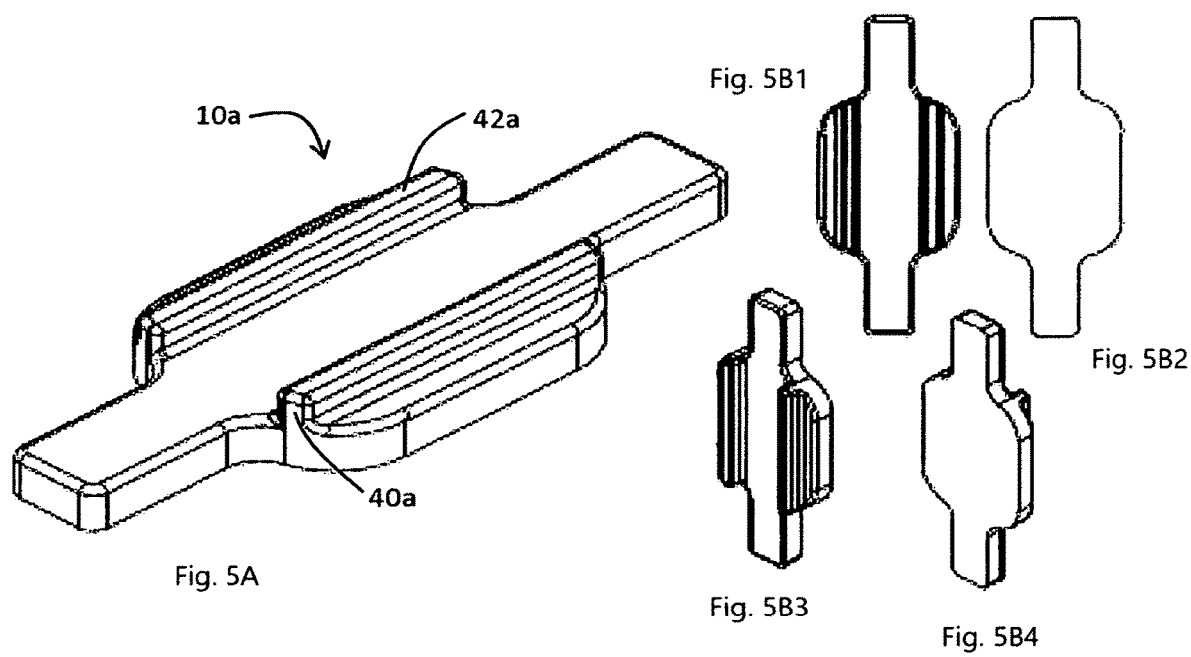
FIG. 5A is a perspective view of the proximal bar variant shown in FIG. 3E.
Figure 5C:
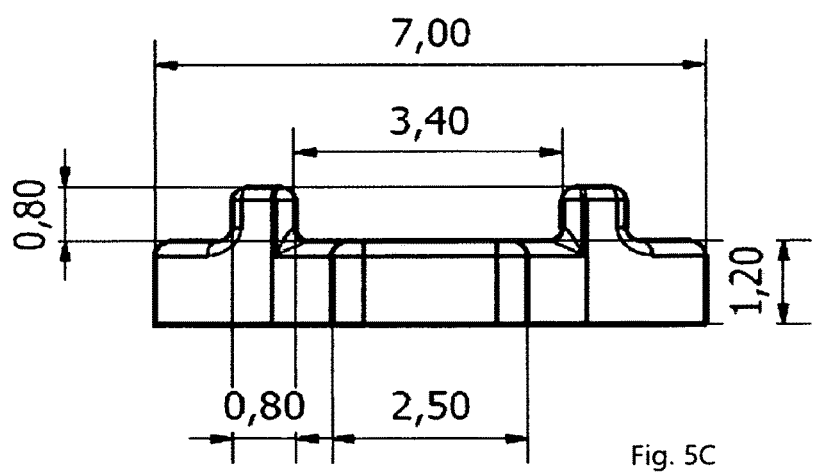

Many variations in the shape and orientation of vertical extensions can be accommodated by the proximal bar. The vertical extensions, shown in FIG. 1 for example, function as vertical walls and therefore the term vertical extension may be used interchangeably with the terms vertical wall or vertical sidewall. The shape and orientation of vertical sidewalls can be modified to suit a particular implementation and can readily deviate from the shape and orientation shown in FIG. 1 while not compromising their function as walls that directly or indirectly transfer resistive force to torque bars to provide resistance to torque or twisting forces exerted upon a direct bridge. For example, variant proximal bar 10a shown in FIG. 5, variant proximal bar 10c shown in FIG. 7, variant proximal bars 10d and 10e shown in FIG. 8, and variant proximal bar 10f shown in FIG. 12 all deviate from the shape and/or orientation of vertical extensions in proximal bar 10 shown in FIG. 1 while maintaining function, and perhaps even enhancing function depending on the needs of a particular implementation.

The vertical extensions, shown in FIG. 1 for example, function as vertical walls and therefore the terms vertical extension and vertical sidewall may be used interchangeably. The vertical extensions shown in FIG. 1 are in parallel alignment with each other and parallel with the longitudinal axis of the proximal bar. However, non-parallel alignment can be tolerated with independent deviation of each vertical bar of up to 30 degrees from parallel alignment with the longitudinal axis of the proximal bar readily tolerated and perhaps found to be advantageous depending on the implementation.

Each vertical extension shown in FIG. 1 is a continuous elongate strip. Vertical extensions can readily be modified to include gaps so as to be discontinuous.

Each vertical extension shown in FIG. 1 is confined within the perimeter of the pad, and typically longitudinal ends of each vertical extension will be limited within the perimeter of the pad. A vertical extension overhanging the perimeter of the pad or longitudinally extending beyond the perimeter of pad can be tolerated. However, when straight torque bars are used, the longitudinal dimension of vertical extensions will typically be less than the longitudinal dimension of the proximal bar. Furthermore, coincidence of a longitudinal end of the vertical extension with a longitudinal end of the proximal bar is typically avoided when straight torque bars are used. Typically, the insertion arms, and more particularly the free insertion ends that are seated within occlusal preparations, are devoid of vertical extensions, when the proximal bar is used in combination with straight torque bars. When a suitable bent torque bar is used to mitigate angular irregularities presented by rotated teeth, the vertical extensions can be positioned on insertion arms and can even span the full longitudinal length of the proximal bar. As shown in FIG. 10, for example, when bent torque bars are used the vertical extensions are co-extensive with the entire length of the proximal bar with longitudinal ends of the vertical extensions coincident with longitudinal ends of the proximal bar.

Interior facing surfaces of first and second vertical extensions act as opposing lateral sidewalls and combine with a coronal surface of the central planar pad to form a channel or trough. The surfaces of the vertical sidewalls that define the trough may be perpendicular to the coronal surface of the central planar pad. However, angular orientations that deviate from a perpendicular alignment can be tolerated and may even be advantageous, for example as seen with the dovetailed shape trough illustrated in FIG. 3Q. Angular deviations of 30 degrees from a perpendicular alignment can readily be accommodated.

Figure 11:
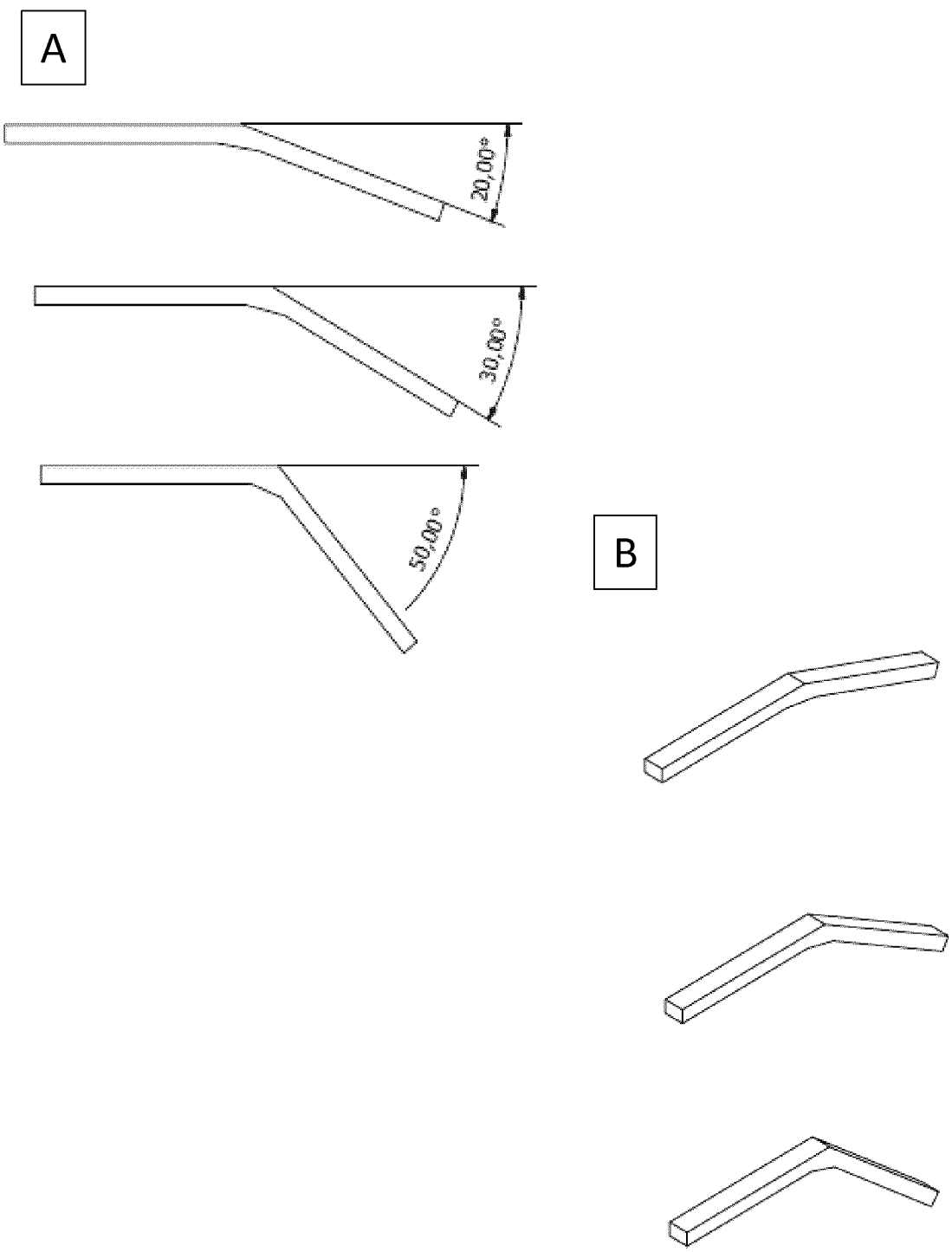
FIG. 11 (A) and (B) show illustrative series of a plurality of bent torque bars that may be provided in a kit.
Figure 12:
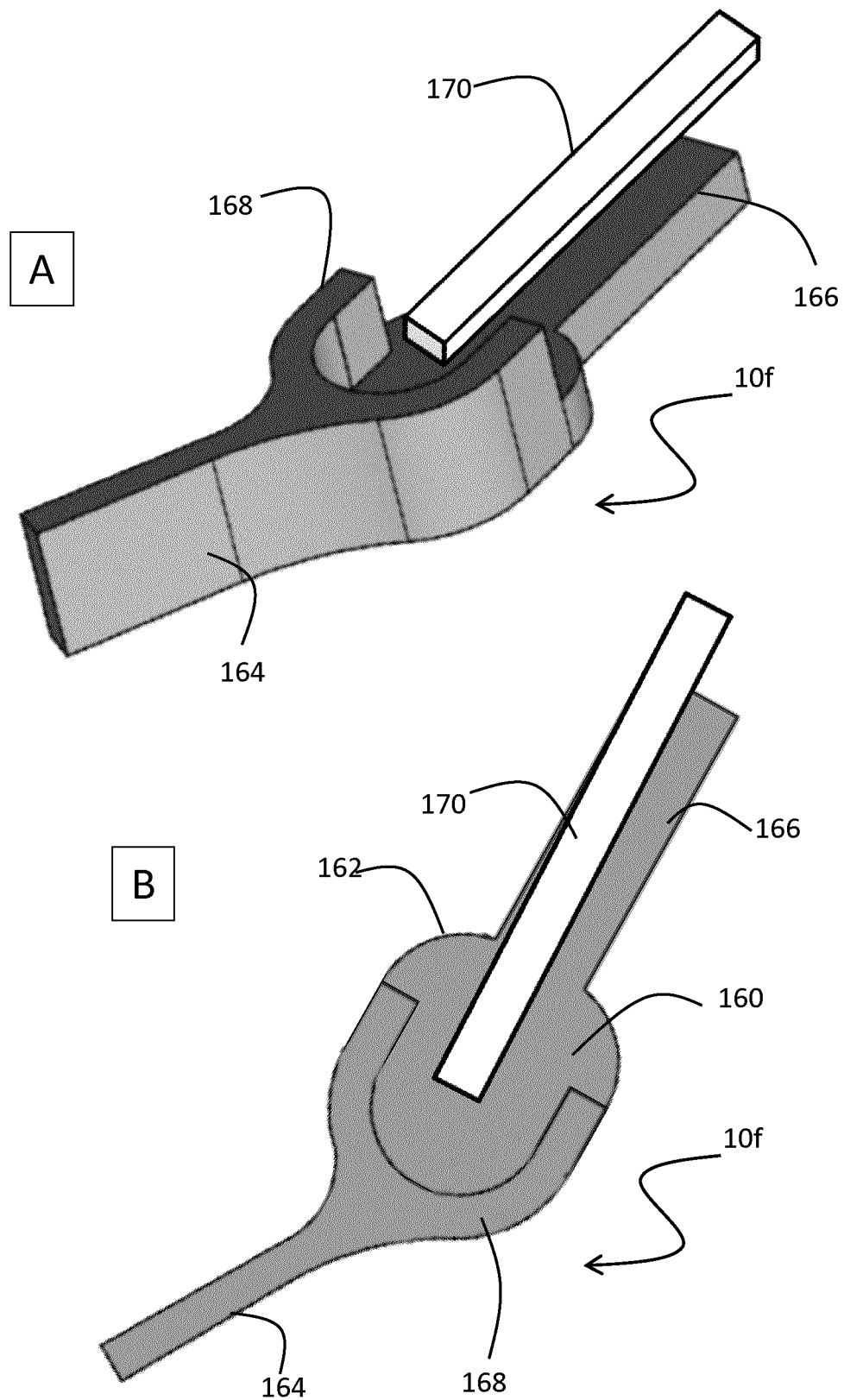
FIG. 12 shows (A) an isometric view and (B) a coronal surface view of yet another variant of the proximal bar used in combination with a single torque bar to replace a first bicuspid or a canine tooth.

The first and second vertical extensions can act as opposing lateral sidewalls to define a trough with first and second opposing and open longitudinal ends, each of the first and second opposing and open longitudinal ends aligned and communicative with at least one of the first and second insertion arms. However, the openings can be modified to be partially closed. Furthermore, one end of the trough may be fully closed as shown in FIG. 12 illustrating a variant proximal bar 10f that is used for reinforcement of direct bridges the replace a first bicuspid tooth or a canine tooth. Proximal bar 10f shown in FIG. 12 comprises a central planar pad 160 bound by a perimeter 162, a first insertion arm 164 extending in a mesial direction from the perimeter to receive abutting support from a distal proximal preparation formed in a canine or lateral incisor and a second insertion arm 166 extending in a distal direction from the perimeter to receive abutting support from a mesial proximal preparation formed in a first or second bicuspid, a semi-tubular vertical extension 168 extending coronally from the pad with an open end of the semi-tubular vertical extension aligned with the second insertion arm 166 and a concave surface of the vertical extension communicative with the second insertion arm 166, a convex surface of the semi-tubular vertical extension facing the first insertion arm 164 and the semi-tubular vertical extension blocking communication of the coronal surface of the pad with the first insertion arm 164. The semi-tubular vertical extension can be any convenient shape including semi-cylindrical as shown in FIG. 11. FIG. 12 also shows a torque bar 170 sized to have a first end to contact and receive abutting support from an occlusal preparation in a bicuspid tooth and a second end to contact and receive abutting support from a coronal surface of the pad.

As shown in the drawings, for example FIG. 1, the coronal facing surface of pad located between the first and second vertical extensions forms a continuous and co-planar surface with at least one of the first and second insertion arms. However, this co-planar arrangement can be modified and deviations from a co-planar arrangement can be tolerated, for example where a shape of a torque bar matches the deviation from a co-planar alignment.

First and second vertical extensions may be positioned at the perimeter of the pad. More specifically, the first and second vertical extensions can be positioned along laterally opposing portions or lateral sides of the perimeter of the pad as shown for example in FIG. 1 in proximal bar 10. However, positioning of first and second vertical extensions at the perimeter is not critical, and vertical extensions laterally offset from the perimeter of the pad are readily tolerated as shown for example in FIG. 5 for variant proximal bar 10a and in FIG. 8 for variant proximal bar 10e.

The lateral spacing of the first and second vertical spacing can be modified to suit a particular implementation. As shown in FIG. 1, a lateral spacing of the interior facing surfaces of the first and second vertical extensions is greater than the width of at least one of the first and second insertion arms. However, as shown in FIGS. 8 and 9 for variant proximal bar 10d the lateral spacing of first and second vertical extensions may be less than both of the insertion arms. Similarly, while FIG. 1 shows lateral spacing of the interior facing surfaces of the first and second vertical extensions to be at least three fold greater than the width of at least one of the first and second elongate torque bars, this dimensional relationship is not a requirement as shown for example in FIG. 9 and FIG. 10. The lateral spacing to be greater than the width of an insertion arm or at least two to three fold greater than the width of a torque bar does provide a significant advantage when straight torque bars are used in that such lateral spacing allows for flexibility of angular orientation of the straight torque bar relative to the proximal bar to accommodate a rotated abutment tooth. The lateral spacing can be less than the width of an insertion arm, for example as shown in FIGS. 9 and 10, where bent torque bars are used to accommodate angular irregularities presented by rotated teeth.

Shape and orientation of elongate torque bars can be varied. Torque bars can have any desired lateral cross-sectional shape including circular, triangular and trapezoid shapes, and may also include other polygonal shapes defining its lateral cross-section. The orientation of each torque bar can be varied in terms of angular orientation as well as longitudinal overlap with the proximal bar. Factors influencing variance in angular orientation can include degree of misalignment of an abutment tooth as well as choice of straight versus bent torque bars and the degree of bend of a bent torque bar. Longitudinal overlap of a torque bar with a proximal bar will be less than the full length of the proximal bar as a single torque bar will never be used to span the proximal bar to be seated in both mesial and distal occlusal preparations. Thus, generally a first longitudinal end of a first elongate torque bar is positioned within a first occlusal cavity preparation but not in a second occlusal cavity preparation, and a first longitudinal end of a second elongate torque bar is positioned within the second occlusal cavity preparation, but not in the first occlusal cavity preparation.

While the longitudinal overlap of the torque bar with the proximal bar can extend beyond the perimeter of the pad, frequently a longitudinal end of the torque bar will be positioned within the perimeter of the pad and in between the vertical extensions. For example, given that the first ends of the first and second elongate torque bars are to be positioned in first and second occlusal preparations, respectively, then the second longitudinal end of the first elongate torque bar is positioned in between the first and second vertical extensions, and the second longitudinal end of the second elongate torque bar is positioned in between the first and second vertical extensions.

The torque bars need not contact the vertical extensions, as resistance to torque forces can be transferred from the vertical extensions to the torque bars through intervening restorative material in the absence of direct contact between torque bar and vertical extension. However, direct contact between a torque bar and a vertical extension is readily tolerated and may be likely where lateral spacing of the interior facing surfaces of the vertical extensions is narrower than the insertion arms. In such cases the second longitudinal end of the first elongate torque bar may contact a surface of at least one of the first and second vertical extensions, and/or the second longitudinal end of the second elongate torque bar may contact a surface of at least one of the first and second vertical extensions.

Longitudinal overlap of each torque bar with a proximal bar will typically include overlap with a single insertion arm and all or part of the pad, and will typically avoid overlap with both insertion arms. For example, the first elongate torque bar may have at least one longitudinal flat side receiving abutting support from the first insertion arm and less than 75% of the longitudinal distance of the coronal facing surface of the pad. In another example, the second elongate torque bar may have at least one longitudinal flat side receiving abutting support from the second insertion arm and less than 75% of the longitudinal distance of the coronal facing surface of the pad.

Just as torque bar shapes can accommodate extensive variation, torque bars can also include various types of bends. Bends may vary with respect to angle, accommodating any desired acute angle, typically ranging from 5 degrees to 60 degrees. Bends can also vary in terms of shape, for example sharp bends that form a vertex at the bend ranging to smooth bends that form a curve first and second elongate torque bars includes a bend. Typically, the bend of a torque bar is located in a central portion of the torque bar so that the bend can be positioned at or near the isthmus. First and second torque bars can be independently selected to be straight or include bends, and if bent then independently selected for a desired angle, depending on the abutment teeth alignment of a particular implementation.

A kit can be prepared that includes at least one size of proximal bar and at least one size of torque bar and instructions for configuring and aligning the proximal bar and the torque bar as a reinforcement bar combination to provide structural support and to create a direct dental bridge. Typically, kits will include more than one size of proximal bar and more than one size of torque bar. As shown in FIGS. 6 and 7, kits may include a plurality of different sizes of proximal bars, where each of the plurality of different sizes correspond to a particular type of edentulous space or a particular sized pontic for replacing a particular missing tooth. For example, the proximal bar can be provided in a plurality of different sizes, each of the plurality of different sizes providing a different sized pad with the perimeter of the pad corresponding to a different posterior tooth. Kits will typically include torque bars in a plurality of different sizes and/or a plurality of different shapes. For example, torque bars may be categorized as molar torque bars and bicuspid torque bars depending on the intended occlusal preparation that is to receive a torque bar. Molar torque bars may be provided with larger cross-sectionals areas than bicuspid torque bars.

A kit may include proximal bars with wide pads to support the pontic and with sufficiently spaced apart vertical extensions being manufactured and provided for the dentist in a kit of increments of length. For example, a plurality of proximal bar sizes may be provided in a kit for use including proximal bars with pads of varied longitudinal/horizontal length including for example 4 mm, 5 mm, 6 mm, 7 mm, 8 mm etc to 25 mm, as illustrated in FIG. 6 or 7. In cases of long spans proximal bars may be made with slight variations to increase the strength needed for longer spans, ie. proximal bars of pad length greater than 10 mm.

A kit may include torque bars of sizes for molar torque bars and of sizes for bicuspid torque bars that can be provided for the dentist to cut to length for placement in each proximal bar and pontic combination where the dentist can select the torque bar for either the molar or bicuspid depending on the abutment tooth. Torque bar size and shape variation schemes may be distinguished on the basis of any convenient category with a molar versus bicuspid categorization being an illustrative example.

A kit may include bent torque bars to be used in cases of tipped abutments and cases where the width of the vertical sidewalls of the proximal bar and the direction of the torque bar determined by the pulp horns of the abutment teeth do not accommodate the straight torque bar due to the more than normally experienced rotation and of the abutment teeth. Kits may include a plurality of bent torque bars providing a selection of angular increments for the dentist as shown for example in FIG. 11. Bent torque bars may be provided in a plurality of different angles including, for example, one or more angles selected from about 5 degrees, about 10 degrees, about 15 degrees, about 20 degrees, about 25 degrees, about 30 degrees, about 35 degrees, about 40 degrees, about 45 degrees, about 50 degrees, about 55 degrees, about 60 degrees, or any angle therebetween. Bent torque bars may also be categorized as molar torque bars and bicuspid torque bars, with molar torque bars typically providing a larger lateral cross-sectional area than bicuspid torque bars.

The proximal bar and the torque bars are an assembly that act in combination and co-operate to form a structural reinforcement for a direct dental bridge. The reinforcement is a framework that provides a supporting scaffold for placing and shaping a restorative material to replace at least one missing tooth.

Torque bars are not joined or coupled to the proximal bar until the torque bars are positioned with the proximal bar during a direct dental bridge restoration and the proximal bars and torque bars reinforcement combination is fixed in position by application and curing of a restorative material such as a photo-curable composite resin restorative material having properties for replacement of a posterior tooth or properties for replacement of a canine anterior tooth. The reinforcement bar combination may be used with any suitable dental restorative material. The restorative material is often chosen to be a composite resin restorative material, but other restorative materials may also be used. Composite resins are often composed of Bis-GMA and other dimethacrylate monomers (TEGMA, UDMA, HDDMA), a filler material such as silica and in most current applications, a photoinitiator. As examples of composite resin restorative material that may be useful, the composite resin restorative material may include a photoinitiator and one or more compounds from the group consisting of glass, silica, zirconia, ceramic, quartz, and aluminum.

Manufacturing of the proximal bars and torque bars can be accomplished using any suitable technique, including any suitable mold, machining or extrusion technique. Each proximal bar is typically an integral unit and each torque bar is typically an integral unit.

The proximal bar and the first and second elongate torque bars can be varied in size and shape depending on the requirements of a direct restoration as dimensions of occlusal cavity preparation and edentulous space differ among posterior teeth, for example bicuspids provide a smaller occlusal surface compared to molars. Tables 1 and 2 provide illustrative examples showing differences in longitudinal and lateral dimensions comparing single tooth replacements with a direct dental bridge.

TABLE 1

Examples of longitudinal dimensions for direct bridge structural elements for producing direct restorations to replace a single missing tooth.

| Missing tooth | Proximal bar - central pad length (mm) | Mesial torque bar length (mm) | Distal torque bar length (mm) |
|---|---|---|---|
| 1st bicuspid | 3-5 | n/a | 5-6 (2nd Bicuspid) + 4-6 (proximal bar) |
| 2nd bicuspid | 3-5 | 5-6 (1st Bicuspid) + 4-6 (proximal bar) | 8-9 (1st molar) + 4-6 (proximal bar) |
| 1st molar | 5-9 | 5-6 (2nd Bicuspid) + 4-6 (proximal bar) | 8-9 (2nd molar) + 5-10 (proximal bar) |
| 2nd molar | 5-9 | 8-9 (1st molar) + 5-10 (proximal bar) | 8-9 (3rd molar) + 5-10 (proximal bar) |
| 3rd molar (wisdom tooth) | n/a | n/a | n/a |

TABLE 2

Examples of lateral dimensions for direct bridge structural elements for producing direct restorations to replace a single missing tooth.

| Missing tooth | Lateral spacing of Vertical sidewalls of Proximal bar: interior width (mm) | Mesial torque bar width (mm) | Distal torque bar width (mm) |
|---|---|---|---|
| 1st bicuspid | 4-6 | n/a | 1.0-1.4 |
| 2nd bicuspid | 4-6 | 1.0-1.4 | 1.2-1.8 |
| 1st molar | 4-6 | 1.0-1.4 | 1.2-1.8 |
| 2nd molar | 4-6 | 1.2-1.8 | 1.2-1.8 |
| 3rd molar (wisdom tooth) | n/a | n/a | n/a |

Manufacturing of the proximal bars and torque bars can be accomplished using any suitable technique, including any suitable mold, machining or extrusion technique. Each proximal bar is typically an integral unit and each torque bar is typically an integral unit. Proximal bars and torque bars can be made from the same or different material as desired. Proximal bars and torque bars can be made of any suitable dental material used for reinforcement bars such as dental ceramic materials including for example zirconia, alumina toughened zirconia, ytria stabilized zirconia, or Ceria-doped tetragonal zirconia polycrystal/alumina (Ce-TZP/Al$_2$O$_3$).

The proximal bar has small insertion arms/ends that fit into proximal preparations in the abutment teeth where the proximal preparations have a flat bottom or gingival seat, and where the flat proximal gingival seat is cut as wide as is biologically beneficial where this width is up to about 5 mm wide but frequently less than about 4 mm wide.

The insertion arm of the proximal bar can be flat where it inserts into the abutment tooth and sits on the flat gingival seat so it can resist rotational forces around the long axis of the bridge. When bent torque bars are used in combination with the proximal bar, one or both of the insertion arms can be configured with substantially parallel first and second vertical extensions or sidewalls and therefore the range of vertical dimension of the insertion arm can be increased by the added thickness of the vertical extension. Regardless of whether the insertion arm includes vertical sidewalls or is devoid of vertical sidewalls, the apical surface of the insertion arm will typically be flat to sit on a flat gingival seat of a proximal preparation.

The insertion arm of the proximal bar typically ranges from about 2 mm wide to about 5 mm wide. The insertion arm width should be sufficiently narrow to preserve the embrasure space for tooth and gum cleansing and is frequently less than about 4 mm, with widths closer to 5 mm wide suitable in some cases of large teeth.

The proximal preparation is cut deep enough gingivally to allow for the placement of the torque bar in the occlusal preparation coronal to the proximal bar, where the occlusal preparation is cut reasonably no more than 2 mm deep into the occlusal surface.

To accommodate the proximal bar and the torque bar the proximal preparation must be cut a minimum of 3 mm deep or even 4 mm deep thus allowing the vertical depth of the proximal preparation to accept a proximal bar gingivally in the proximal preparation and torque bar sitting coronal to the proximal bar in the proximal preparation.

If the proximal preparation is cut 3 mm deep then the proximal bar can be 1 mm thick with the occlusal preparation being cut the 2 mm deep. If the proximal preparation is cut 4 mm deep then the insertion end of the proximal bar can be 2 mm thick and the occlusal preparation can be cut 2 mm deep.

Typically the proximal preparation will not be cut more than 4 mm deep because the abutment tooth narrows towards the root area and so cutting the proximal bar deeper than the 4 mm results in the proximal preparation getting closer to the nerve of the tooth.

Based on steric and spatial constraints observed in mouths, size ranges of various portions of the proximal bar may be established. For example, the insertion arm of the proximal bar functions well in the shape of a rectangular bar that has a flat bottom to sit on a flat gingival seat of a proximal preparation, where the flat bottom insertion arm is most often 2 to 4 mm wide and 1 to 2 mm vertically high. When bent torque bars are used in combination with the proximal bar, one or both of the insertion arms can be configured with substantially parallel first and second vertical extensions or sidewalls and therefore the range of vertical dimension of the insertion arm can be increased by the added thickness of the vertical extension.

The central planar pad of the proximal bar is a thin flat plate or platform designed to support the width (buccolingual) and length (mesio-distal) of a replacement pontic tooth where the perimeter of the pad is of circular or oval shape or has rounded corners, and the pad typically ranges from 1 to 2 mm in thickness. The pad can be up to 3 mm thick but over 2 mm the pad gets difficult to use in numerous cases in the mouth as there is commonly only 5 mm of space between the gingiva of an edentulous space and an occlusal surface of a corresponding tooth extending from the opposing jaw. The coronal surface of the central planar pad will typically be flat. The apical surface of the central planar pad may be flat or may optionally be modified to mimic and facilitate a pontic shape. For example, to mimic a desired pontic shape the apical surface of the pad may be rounded on its lateral edges, or the apical surface could be rounded as a partial cylinder surface or partial domed surface so that a lateral cross-section of the pad shows a substantially flat coronal surface and a rounded apical surface, thereby providing an apical surface that mimics the base of the pontic as it contacts the gingival surface. It should be noted that even if the apical surface is optionally rounded, the apical surface of the insertion arms will remain flat.

The maximum width of most teeth is about 10 mm. However the pontic has to be made with a covering of composite resin surrounding the proximal bar so space is needed on both sides of the proximal bar pad for the composite covering over the sides of the proximal pad. Therefore, the width of the central pad portion of the proximal bar can typically range from about 5 mm to about 9 mm, and frequently ranges from about 6 mm to about 7 mm.

Thus, a useful structure of the proximal bar is a flat pad in a central portion of the proximal bar, the flat pad ranging from about 5 mm to about 9 mm wide and from about 1 mm to about 2 mm thick with round corners to mimic the round shape of a tooth with proximal insertion arms which extend as rectangular bars from the opposing sides of the flat pad where the insertion arm ends are about 2 mm to about 4 mm wide and from about 1 mm to about 2 mm thick. The insertion arms can be provided with a length from about 5 mm to about 6 mm so the dentist can cut them to length and fit them into the proximal preparations across the span. When bent torque bars are used in combination with the proximal bar, one or both of the insertion arms can be configured with substantially parallel first and second vertical extensions or sidewalls and therefore the range of vertical dimension of the insertion arm can be increased by the added thickness of the vertical extension.

Insertion arms/ends can be sized to fit in any convenient manner including, for example, sized to predetermined dimensions as manufactured or sized by a dentist that cuts and/or shapes mesial and distal insertion arms to fit mesial and distal proximal preparations, respectively, when creating a specific direct dental bridge. As an example of a dentist cutting a proximal bar during a direct dental bridge procedure, proximal bars can be manufactured with each insertion arm having a minimum 6 mm length/longitudinal dimension, with each arm cut and/or shaped by the dentist so that arms fit mesial and distal proximal preparations and fit the span. In this example, about 3 mm on each insertion arm can be cut away leaving 3 mm of each insertion arm sitting in the mesial and distal proximal preparation.

Figure 13:
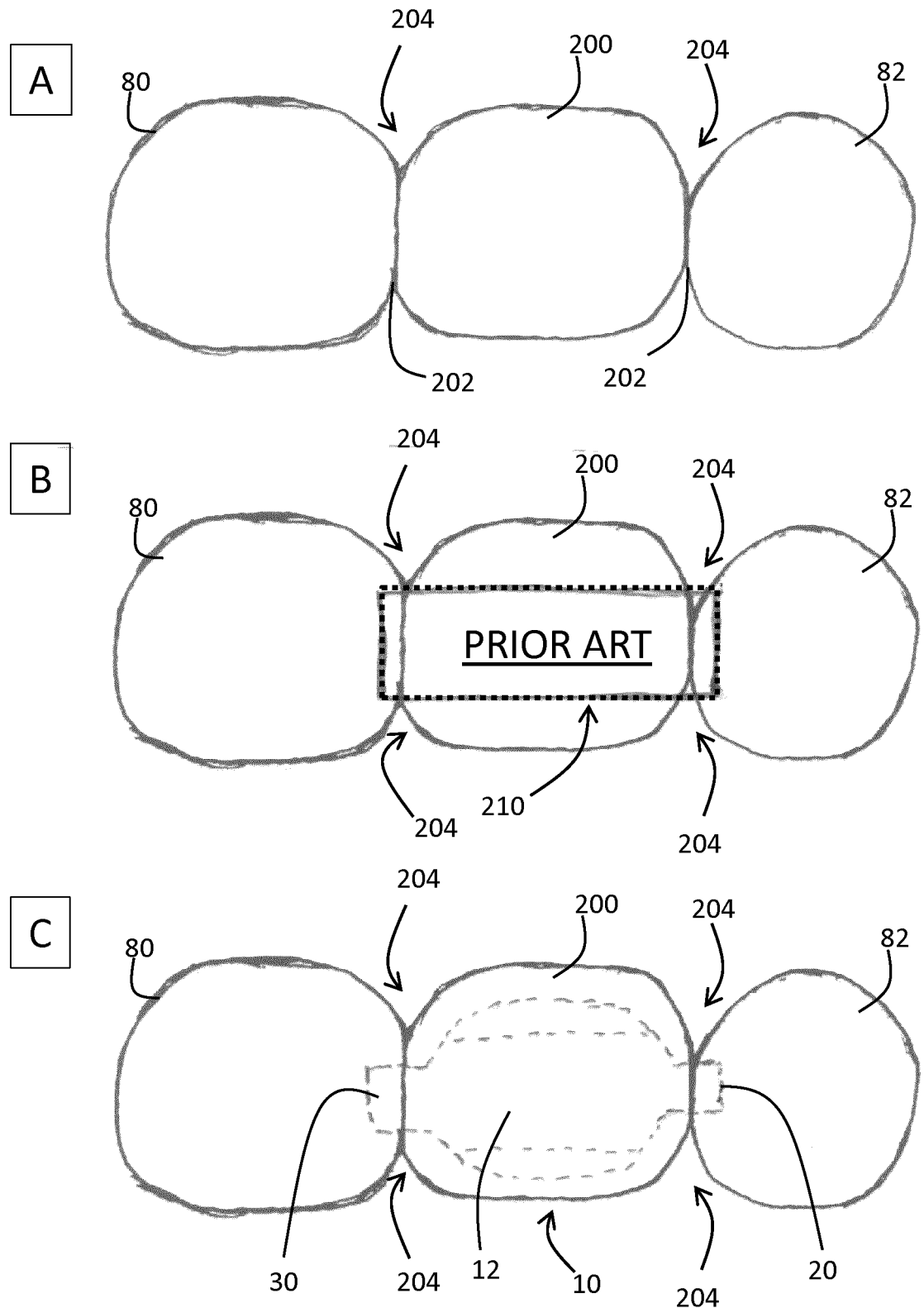
FIG. 13 (A) and (C) show schematic representations of a direct dental bridge illustrating advantages of the proximal bar shown in FIG. 1 in comparison to a prior art proximal bar (B).

A central planar pad is a platform or plate in a central location of the proximal bar. The central planar pad is wider than both the first insertion arm and the second insertion arm. An advantage of the central pad being wider than first and second insertion arms is that the central pad can provide improved pontic support compared to a prior art proximal bar that has a single and consistent lateral cross-section area along its entire longitudinal length. Another advantage is that central pad does not extend within an embrasure space between a pontic and an abutment tooth as compared to embrasure encroachment seen in a prior art proximal bar. A further advantage of central planar pad is it provides a platform for wider spacing of vertical extensions to accommodate a greater range of angular orientation of torque bars due to rotated teeth. These advantages are illustrated in FIG. 13.

FIG. 13A shows a top view (coronal view) of an abutment molar 80 and an abutment bicuspid 82 and a molar pontic 200 between the two abutments. It can be seen that in normal architecture the contacts of the teeth are small defining the isthmus 202 of the pontic with each abutment tooth and the embrasure spaces 204 are the indentations of space on either side (buccal side and lingual side) of the isthmus contact 202. The embrasure spaces 204 are needed to allow adequate cleaning of the gum tissues FIG. 13B shows a one-size-fits-all prior art proximal bar 210 installed into the abutment teeth and across and within the pontic. The prior art proximal bar 210 has a single and consistent lateral cross-section area along its entire longitudinal length and as a result is cut to size and used for all direct restorations to replace a missing posterior tooth regardless of the specific details of the abutment teeth and edentulous space.

FIG. 13B shows that the single width prior art proximal bar 210 which is attempting to give adequate occlusal support to the width of the pontic 200 is encroaching on the embrasure spaces 204 at the isthmus 202 of the pontic and the abutments.

Since the prior art proximal bar 210 requires a single and consistent width along its entire longitudinal length, the choice of width faces dueling or competing concerns of sufficient width in the central location of the proximal bar to provide pontic support and sufficient narrowness at the ends of the proximal bar to avoid encroachment upon embrasure spaces.

FIG. 13C shows that proximal bar 10 solves these dueling or competing concerns by providing a central pad that is wider than both the first and second insertion arms. The insertion arms, 20 and 30, are sufficiently narrow in width to protect the embrasure space 204 for adequate cleaning and also to leave enough room for composite resin to cover the proximal bar and hide it under the composite resin for desired esthetics. Furthermore, the central pad 12 is sufficiently wide in the central portion of the proximal bar to provide suitable pontic support. Thus, proximal bar 10 can provide suitable pontic support without compromising embrasure spaces. The wider central pad of proximal bar 10 compared to the relatively narrow central portion of prior art proximal bar 210 provides a further advantage of allowing laterally spaced apart vertical sidewalls or walls to be far enough apart to accept the torque bars from rotated teeth.

Proximal bars and torque bars described herein may be used in any desired combination to produce a direct dental bridge. Methods to produce direct dental bridges comprise steps of positioning a proximal bar to span from a mesial proximal preparation to a distal proximal preparation and positioning at least one torque bar in an occlusal preparation and covering the proximal bar and torque bar with a restorative material. The step of positioning at least one torque bar can include a first torque bar contacting a mesial occlusal preparation but not contacting a distal occlusal preparation, and a second torque bar contacting a distal occlusal preparation, but not contacting a mesial occlusal preparation. A further step can include for example cutting a proximal bar and cutting at least one torque bar to be suitably sized for a proximal and occlusal preparations, respectively. A further step can include selecting a suitable proximal bar from a plurality of different sized and/or shaped proximal bars. A further step can include selecting a suitable torque bar from a plurality of different sized and/or shaped torque bars. A further step can include curing and shaping of restorative material.

Directional terms such as vertical, horizontal, coronal, occlusal, apical, gingival, buccal, lingual, mesial, and distal back are intended in the context of a reinforcement bar as placed in a direct bridge in a mouth, but use of these directional terms does not require that reinforcement bar be installed in a mouth and can describe structural features of a reinforcement bar outside while outside the mouth.

Embodiments described herein are intended for illustrative purposes without any intended loss of generality. Still further variants, modifications and combinations thereof are contemplated and will be recognized by the person of skill in the art. Accordingly, the foregoing detailed description is not intended to limit scope, applicability, or configuration of claimed subject matter.

What is claimed is:

1. A reinforcement bar combination for supporting a direct dental bridge between first and second abutment teeth, each having a proximal cavity preparation and an occlusal cavity preparation, the reinforcement bar combination comprising: an elongate proximal bar comprising a central planar pad, a first insertion arm extending in a mesial direction from the pad, a second insertion arm extending in a distal direction from the pad, the first and second insertion arms being coaxially aligned, the elongate proximal bar being preformed and having a width which decreases from the central planar pad to the first and second insertion arms, each of the first and second insertion arms having a flat bottom; the first and second insertion arms each having ends which are dimensioned to fit within the first and second proximal cavity preparations of the first and second abutment teeth; a first vertical sidewall extending in a coronal direction from a coronal surface of the proximal bar; a second vertical sidewall extending in a coronal direction from the coronal surface of the proximal bar; and a torsion member positioned between the vertical walls of the proximal bar, the torsion member adapted to resist torsional forces, the torsion member having opposite first and second ends each of which are adapted to be inserted into the first and second occlusal preparations of the first and second abutment teeth, respectively, the torsion member configured such that the opposite first and second ends thereof can be positioned at an angle to each other such that they are not coaxially aligned in a buccal-lingual direction when the torsion member is positioned between the vertical walls of the proximal bar.

2. The reinforcement bar combination for supporting a direct dental bridge as in claim 1 wherein the torsion member comprises separate first and second elongated torque bars, the first end of the torsion member being formed on the first elongated torque bar and the second end of the torsion member being formed on the second elongate torque bar.

3. The reinforcement bar combination for supporting a direct dental bridge as in claim 2 where the first and second vertical sidewalls are positioned on lateral aspects of the pad of the proximal bar allowing the first and second elongate torque bars to be placed between the vertical side walls in a non-coaxial relationship.

4. The reinforcement bar combination for supporting a direct dental bridge as in claim 2 wherein the first and second vertical sidewalls are placed on at least one of the insertion arms.

5. The reinforcement bar combination of claim 4 wherein at least one of the first and second elongate torque bars includes a bend.

6. The reinforcement bar combination as in claim 1 where the torsion member comprises a dental fiber, wherein the dental fiber reinforces a composite resin.

7. The reinforcement bar combination of claim 1 wherein the first insertion arm has a different lateral cross-sectional area or shape than the lateral cross-sectional area or shape of the second insertion arm.

8. A kit comprising the reinforcement bar combination of claim 1 wherein the proximal bar is provided in a plurality of different sizes, each of the plurality of different sizes providing a different sized pad with the perimeter of the pad corresponding to a different size of a posterior tooth, and instructions for use of the reinforcement combination to create a direct dental bridge.

9. A reinforcement proximal bar for use in a combination for supporting a direct dental bridge between first and second abutment teeth each having a proximal cavity preparation and an occlusal cavity preparation, the proximal cavity preparations being coaxially aligned and the occlusal cavity preparations not being coaxially aligned, the reinforcement bar comprising: a preformed elongate proximal bar comprising a central planar pad, a first insertion arm extending in a mesial direction from the pad, a second insertion arm extending in a distal direction from the pad, the first and second insertion arms being coaxially aligned, the first and second insertion arms each having a flat bottom, the elongate proximal bar having a width which decreases from the central planar pad to the insertion arms; the first and second insertion arms having ends dimensioned to insert into the first and second-proximal cavity preparations, respectively; a first vertical sidewall extending in a coronal direction from a coronal surface of the proximal bar; a second vertical sidewall extending in a coronal direction from the coronal surface of the proximal bar; and a torsion member positioned between the vertical walls of the proximal bar, the torsion member having opposite first and second ends each of which is dimensioned to be inserted into the occlusal preparations of the first and second abutment teeth, respectively, the opposite first and second ends of the torsion bar being positionable at an angle to each other such that they are not coaxially aligned in a buccal-lingual direction.

10. The reinforcement proximal bar of claim 9, wherein the first vertical sidewall extends in a coronal direction from the coronal facing surface of the pad and a co-planar coronal surface of at least one of the first and second insertion arms, and the second vertical sidewall extends in a coronal direction from the coronal oriented surface of the pad and a co-planar coronal surface of at least one of the first and second insertion arms.

11. The reinforcement proximal bar of claim 10, wherein the first and second vertical sidewalls extend in a coronal direction from the coronal oriented surface of the pad and a co-planar coronal surface of both the first and second insertion arms.

12. The reinforcement proximal bar of claim 11, wherein the proximal bar has a length extending between the ends of the proximal bar, the first and second vertical sidewalls span the entire length of the proximal bar.

13. The reinforcement bar combination for supporting a direct dental bridge as in claim 1 wherein opposing inner surfaces of the first and second vertical sidewalls are angled inwards towards each other, a lateral cross-section of a trough formed by the first and second vertical sidewalls having a dovetailed shape.

14. A method of forming a direct dental bridge between first and second abutment teeth each having a proximal cavity preparation and an occlusal cavity preparation comprising the steps of: a) providing a reinforcement bar combination as defined in claim 1; b) locating the elongate proximal bar between the first and second abutment teeth; c) inserting the end of the first insertion arm into the proximal cavity preparation of the first abutment tooth and inserting the end of the second insertion arm into the proximal cavity preparation of the second abutment tooth; d) placing the torsion member between the first and second vertical side walls of the proximal bar; e) positioning the first and second ends of the torsion member relative to each other such that the first and second ends of the torsion member are positioned at the occlusal cavity preparations of the first and second abutment teeth; f) inserting the first and second ends of the torsion member into the occlusal cavity preparations of the first and second abutment teeth, respectively, and; g) permanently fixing the first and second ends of the proximal bar in the first and second proximal cavity preparations of the first and second abutment teeth, permanently fixing the torsion member between the first and second vertical side walls of the proximal bar and permanently fixing the first and second ends of the torsion member in the first and second occlusal cavity preparations of the first and second abutment teeth, respectively.

15. The reinforcement proximal bar as in claim 9 wherein opposing inner surfaces of the first and second vertical sidewalls are angled inwards towards each other, a lateral cross-section of a trough formed by the first and second vertical sidewalls having a dovetailed shape.

* * * * *